United States Patent [19] [11] 4,241,529
Baur [45] Dec. 30, 1980

[54] PICTURE VIEWER
[75] Inventor: Max Baur, Kollbrunn, Switzerland
[73] Assignee: Licinvest AG, Chur, Switzerland
[21] Appl. No.: 943,471
[22] Filed: Sep. 18, 1978
[30] Foreign Application Priority Data
Oct. 7, 1977 [DE] Fed. Rep. of Germany ....... 2745214
[51] Int. Cl.³ .............................................. G09F 11/30
[52] U.S. Cl. ...................................... 40/513; 40/490; 40/511
[58] Field of Search ................ 40/513, 511, 509, 508, 40/490, 375, 380, 381

[56] References Cited
U.S. PATENT DOCUMENTS

| 535,635 | 3/1895 | Stone | 40/509 |
|---|---|---|---|
| 2,867,051 | 1/1959 | Taylor | 40/509 |
| 3,377,727 | 4/1968 | Weggeland | 40/511 |
| 3,495,345 | 2/1970 | Weggeland | 40/490 |
| 3,783,540 | 1/1974 | Barclay | 40/511 |
| 4,057,920 | 11/1977 | Weggeland | 40/513 |

FOREIGN PATENT DOCUMENTS 173096 7/1906 Fed. Rep. of Germany ............ 40/509

Primary Examiner—John F. Pitrelli
Attorney, Agent, or Firm—H. Dale Palmatier

[57] ABSTRACT

The invention relates to an apparatus for the alternate exposure of individual sheets from a pile of sheets, in particular to a photo-viewing change device, having a bearing face for the sheet edges at one side of a pile of sheets and having an access means or a shifting device for shifting an end sheet of the pile of sheets parallel to its sheet face.

100 Claims, 53 Drawing Figures

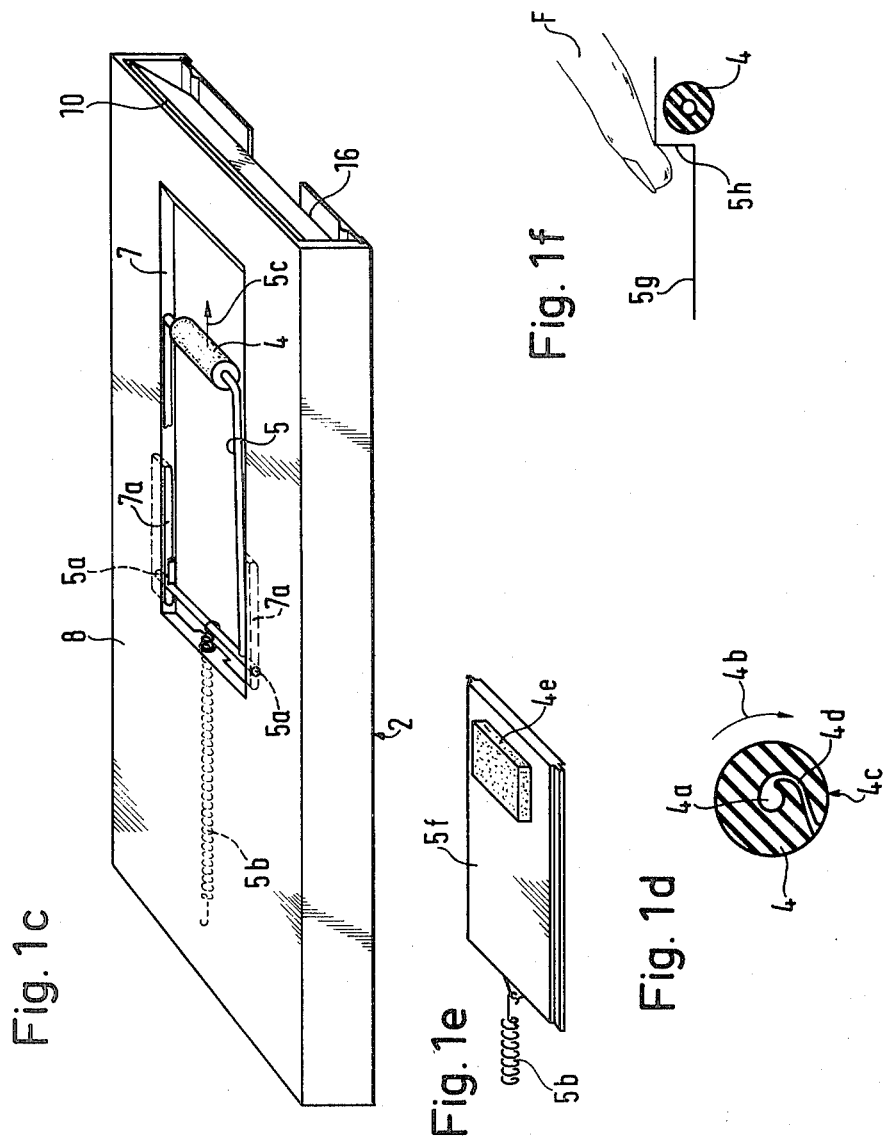

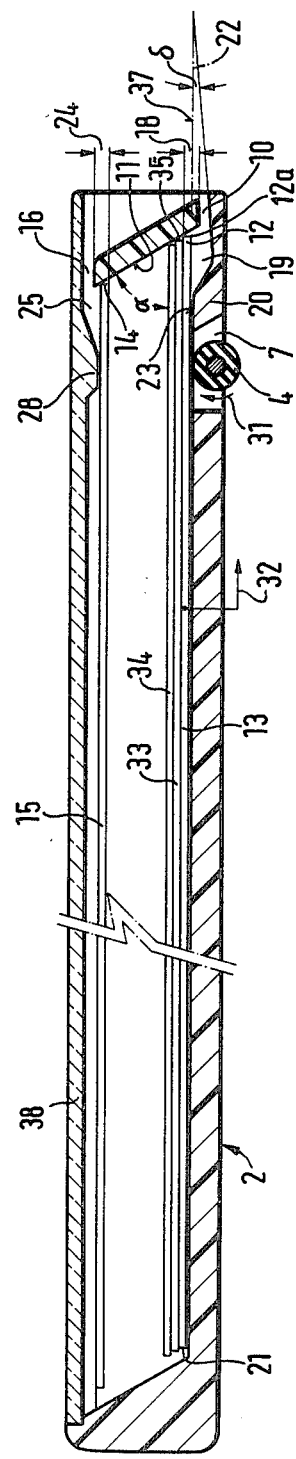
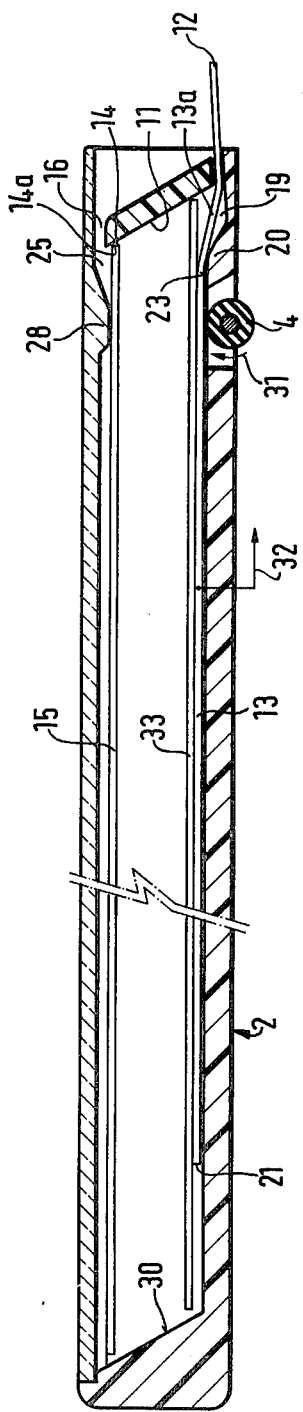
Fig. 2a
Fig. 2b

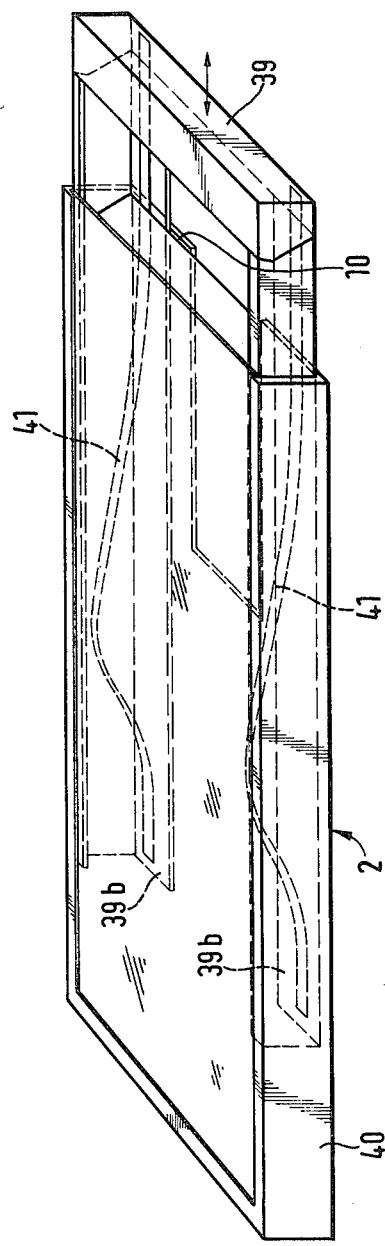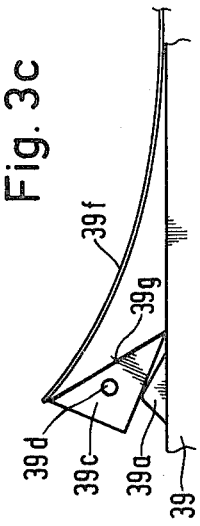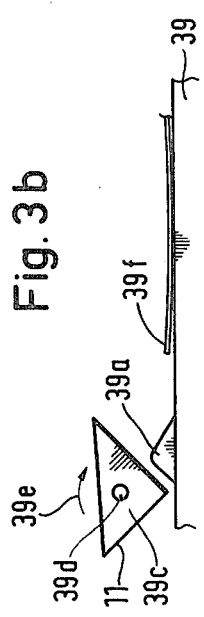

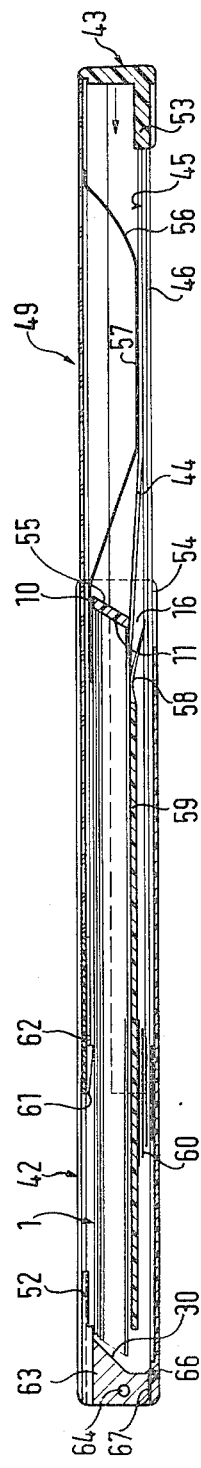
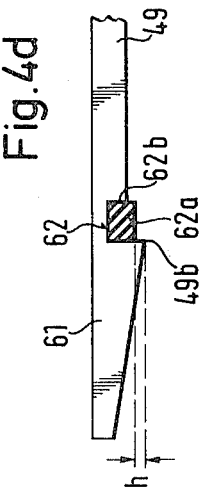
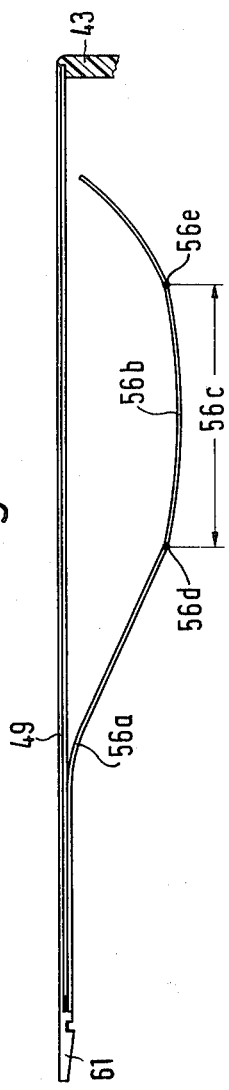
Fig.4a
Fig.4d
Fig.4e

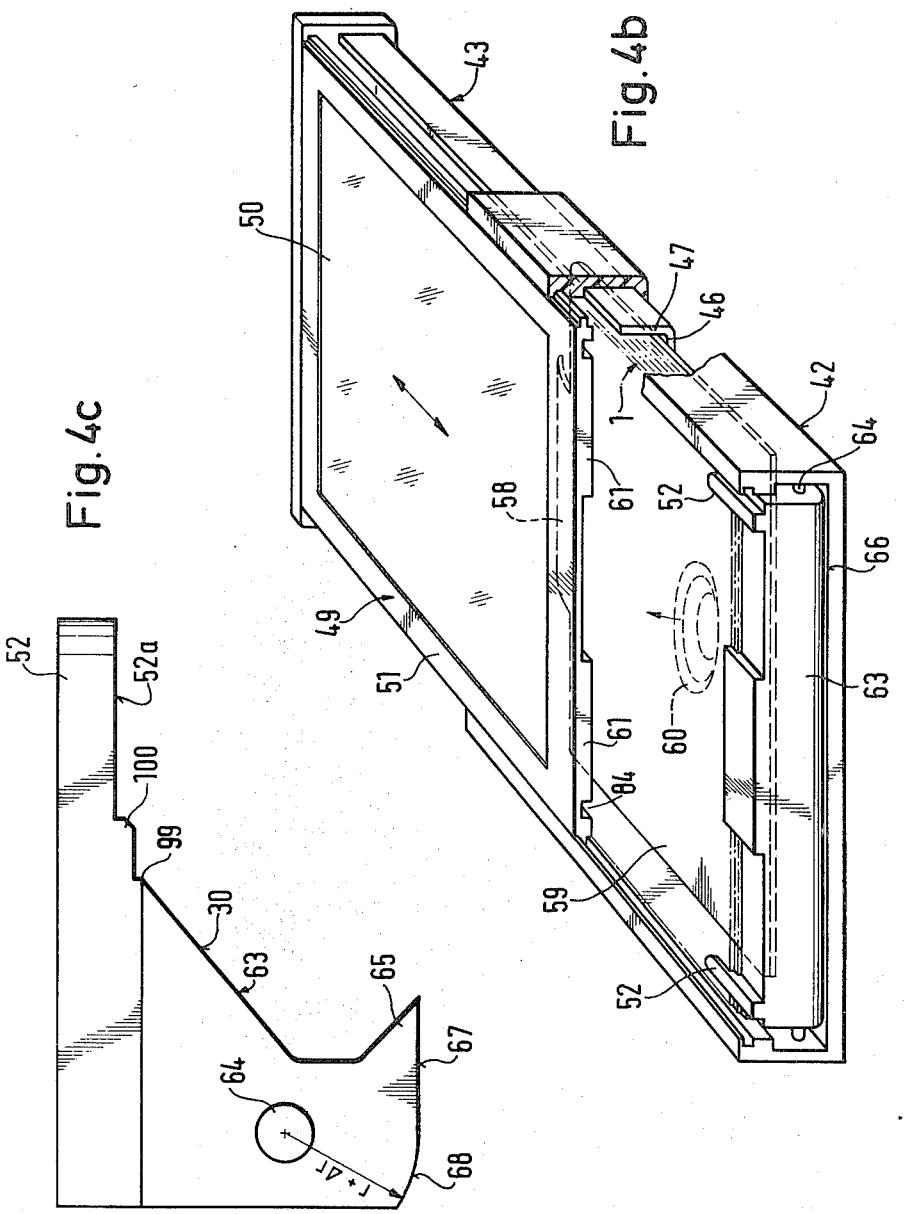

Fig.7d
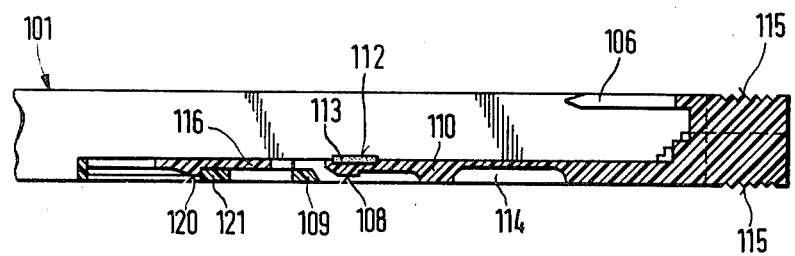
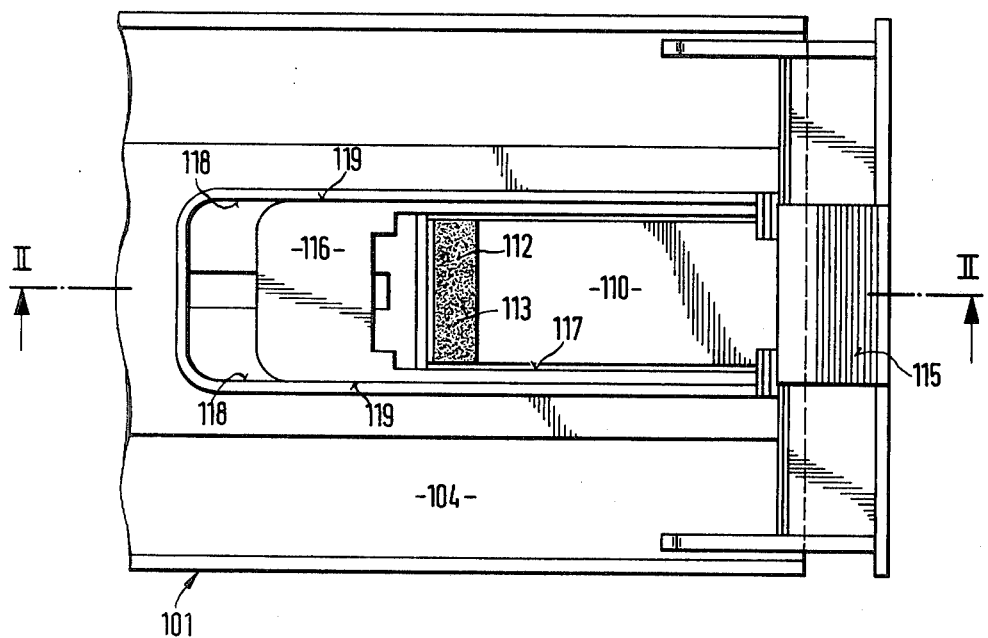
Fig.7e

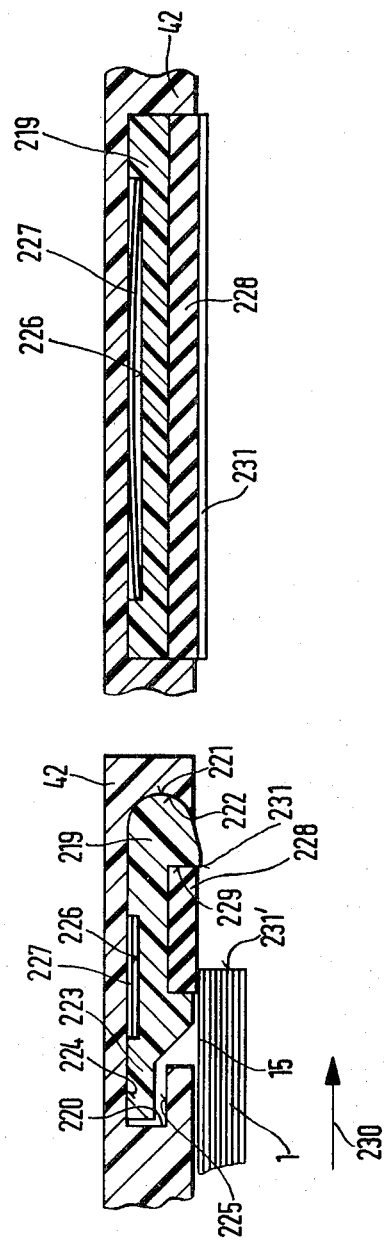

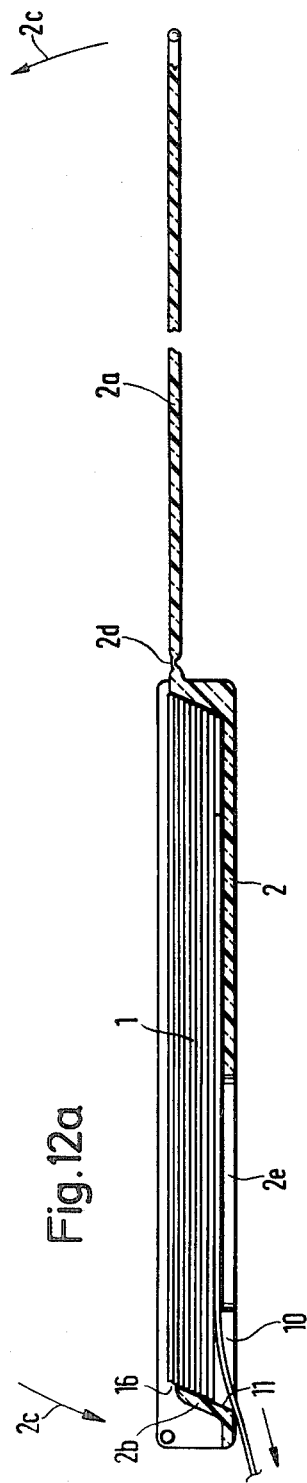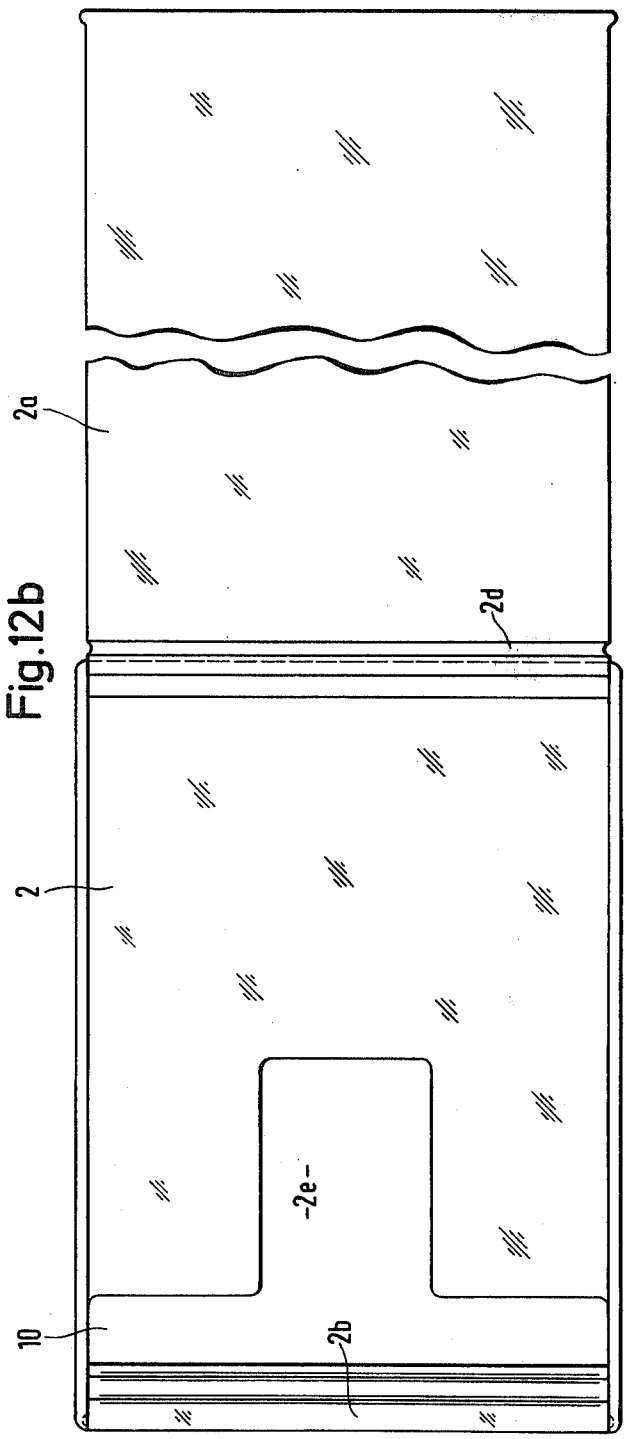

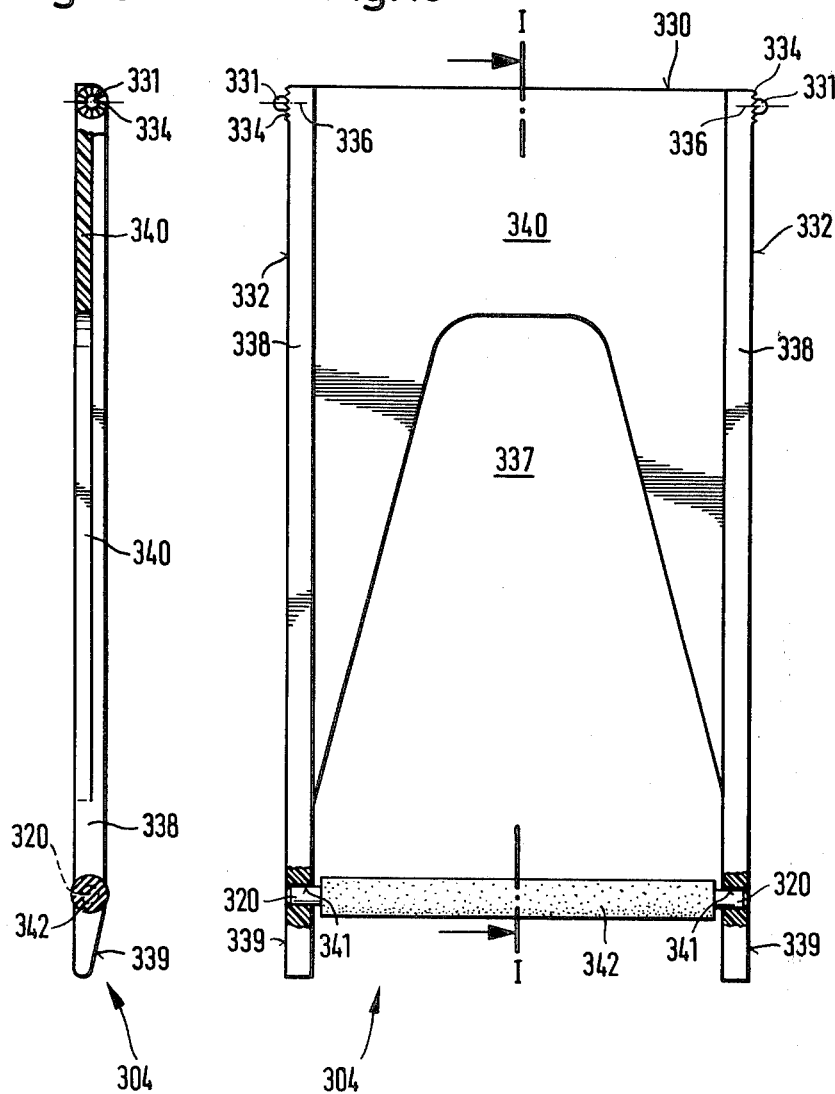
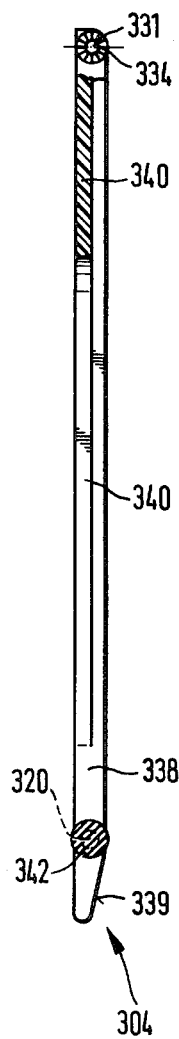
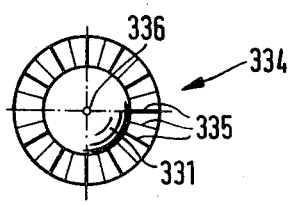

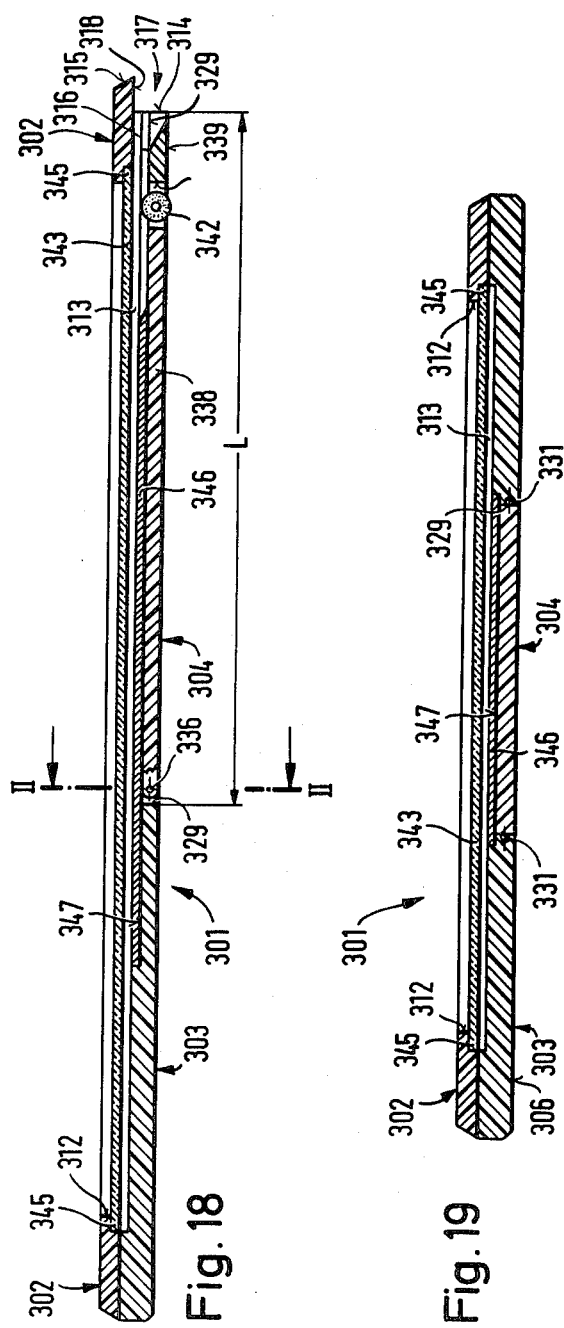

PICTURE VIEWER

BACKGROUND OF THE INVENTION

A device of this type, which is provided as a change device for pictures, diapositives, advertising texts or the like, is known from DT-PS No. 873 908. This known change device is not suitable, however, for the reliable change of relatively thin sheets, which in addition have relatively large dimensional tolerances, such as, for example, normal photographs.

The difficulties involved in creating a photo-viewing change device of the type mentioned at the beginning, which functions reliably, is constructed as simply as possible and can be manufactured at a favourable cost, arise in particular from the fact that the photographs that are alternately to be exposed to view by such a photo-viewing change device are, in spite of their identical format, in many respects different, depending on which manufacturers have supplied the paper and chemicals for developing the photographs and depending on which printing company has produced the finished photographs therefrom.

The photographs supplied by the printing firms are not only of different sizes, the final sizes of $9 \times 9$ cm (more precisely $8.9 \times 8.9$ cm), $9 \times 11.5$ cm and $9 \times 11.7$ cm as well as $9 \times 13$ cm being the most customary, but within these nominal final sizes relatively large dimensional tolerances exist which may amount to 5 mm and which result from the fact that the photographs are made into the final size in a wide variety of methods and manners, such as, for example, by punching out, cutting up, cutting off from paper rolls etc. Furthermore, the thickness of the photographs can vary widely depending on the manufacturer. Photographs are, for example, generally between 0.25 and 0.3 mm thick, but may also be thicker or thinner than this.

Also, the photographs may have rectangular or rounded corners and the edges of the pictures may be differently formed, depending on the manner in which the picture is made into its final size, and may, where applicable, have ridges resulting from cutting.

Finally, the different photographs may be of different strengths and curved in different directions, since the so-called photographic paper does not, in fact, consist of paper, but comprises a plastics carrier which looks like paper on which a large number of different chemical layers is disposed which are stored or embedded in gelatine. Gelatine is a natural product and its properties therefore vary enormously. In particular, gelatine is relatively strongly hygroscopic whereas the plastics carrier is considerably less hygroscopic, so that depending on the air humidity, tensions of varying strength arise between the plastics carrier and the gelatine layers resulting in the very wide variety of curvature of photographs. This curvature is furthermore additionally influenced by the mentioned chemical layers, which are embedded in the gelatine and consist of at least one layer for protection against light, one filter layer, one fixing layer, one protective layer and three color layers and optionally further layers depending on which manufacturer has supplied the paper and which special chemical processes have been used for the development.

SUMMARY OF THE INVENTION

The picture carrier according to the invention, which is provided with a frame that defines a viewing aperture for the picture and which has a rear wall having a support face for the rear side of the picture is, in accordance with the invention, characterized in that there is formed between the rear wall and the frame joined therewith a gap extending around the frame, wherein the plane of the gap extends preferably parallel to the support face and the gap is completely or partially closed towards the lateral edges of the picture carrier but preferably at at least one longitudinal and/or transverse side of the picture carrier extends through to the outside of the picture carrier, and especially in that the gap extends parallel to the support face through to the outside of a lateral edge of the picture carrier and especially over its entire width to the outside of that lateral edge of the picture carrier.

With such a picture carrier, the picture can be inserted through the gap which extends through to the outside and which in relation to the remaining dimensions of the picture carrier is so thin that in practice it is not visible or does not perceptibly intrude, and the inserted picture is held self-mounted by the picture carrier, since its edges are located in the surrounding gap and are thus held in a very simple manner between the frame and the rear wall.

The self-mounting of the picture is in very many cases, especially in the case of photographs of the standard sizes of, for example, $9 \times 12$ and $13 \times 18$ cm, so good that the picture is held flat by the said self-mounting and a glass cover or similar transparent cover is not necessary. Especially in the case of large formats, such as relatively large graphic prints, it is, however, possible, to make the gap so thick that, together with the picture, a transparent film or a thin plate of transparent material, for example acrylic glass, and/or a thin, plate-like support protecting the rear side of the picture when it is inserted, for example, in the case of sensitive graphics, can be pushed simultaneously with the picture through the gap into the picture carrier.

A frame of this type can be made of two parts, or even of only one part, in a simple manner, for example, by appropriate plastics moulding techniques that are known per se, and it can at the same time be so formed that the appropriate holes, by means of which the picture carrier can be suspended in the upright or horizontal position from a nail or pin or the like hammered into the wall, are present on the rear side of the rear wall.

So that the picture carrier can also be stood on a support, for example a table, shelf or the like, it is preferably provided with a prop which is so arranged that it can be sunk flush in the rear wall and is pivotable therefrom, and is so mounted in the rear wall that it can be adjusted to and automatically locks in, a wide variety of angular positions, so that the picture carrier can be stood at a large number of different angles of inclination, either upright or horizontally. The automatic locking in position may be effected especially by jamming and/or by serrations, as explained in more detail below. Together with the prop, the picture carrier according to the invention can therefore be made of three parts, that is, the frame, the rear wall and the prop, or of two parts, the frame and rear wall then being integrally formed and constituting the first part, and the prop constituting the second part. Finally, it is also possible, when using a suitable material, to produce the frame, the rear wall and the prop integrally, the prop being joined to the rear wall or the remaining part of the picture carrier by a pliable plastics joint integrally formed with the prop and with the rear wall.

When, in this connection, it is considered that there are at least five large photographic paper manufacturers, that is to say, Kodak, Agfa, Fuji, 3M and Sakura, which each produce different photographic papers, and that there are innumerable printing companies, which treat the photographs using a wide variety of apparatuses, especially for producing the final size, then it becomes clear that the main problem in creating an operationally reliable photo-viewing change device is to ensure that, in fact, the most varied of photographs can be inserted in it, even though these photographs are nominally the same size. Such a photo-viewing change device must therefore meet the requirement of functioning with the same reliability for all of these different photographs. In particular it should meet the following requirements or at least some of these requirements:

(1) It must be possible for a wide variety of photographs within a pile of photographs to be separated from one another with the same reliability in spite of their differences.

(2) The removal of the different photographs from the pile must, in spite of their difference, function with the same reliability.

(3) The reintroduction of a separated photograph at the other end of the pile (upper or lower end of the pile) must be operationally reliably effected.

(4) The photographs should be pressed against a viewing plate so that they can be observed flat.

(5) During observation of a photograph in the photo-viewing change device and during operation of the change device it must not be possible for any photographs to fall out, irrespective of the position in which the photo-viewing change device is held and operated.

(6) The operation of the photo-viewing change device should be possible in any position, for example, even when the observer is lying on his back.

(7) It must be possible to insert and remove photographs individually or in a pile into and from the photo-viewing change device.

(8) The photo-viewing device must operate irrespective of the number of photographs contained in it, for example both when it is completely full containing, for example, 25 photographs, and when it contains only two or three pictures.

(9) The operation of the photo-viewing change device must be absolutely foolproof; in particular, if the mechanism of the photo-viewing change device is only partly operated the photographs must not be damaged, compressed, crushed, scratched or their condition impaired in any other way.

(10) It shall, if desired, be possible to view the photographs permanently, for which purpose it is necessary to be able to stand them or hang them up by means of the photo-viewing change device.

(11) It should be possible to pile the photo-viewing change device in an orderly and suitable form.

(12) The photo-viewing change device should be "fit for carrying in a pocket" so that it is possible to carry the photographs together with the photo-viewing change device in a pocket, if possible a suit pocket or handbag; for this purpose the photo-viewing change device should be as far as possible flat, rounded at the corners and pleasant to the touch.

(13) Furthermore, simple and favourably-priced manufacture of the photo-viewing change device is desirable, and as far as possible automatic manufacture and assembly should be possible; the parts should be "fit for injection moulding" so that they can be injection-moulded from plastics material.

(14) The change mechanism must be operationally reliable to the effect that it is always exactly one photograph that is removed and reinserted into the pile, that is to say, if the operation is correct and complete two photographs are never simultaneously changed and it is not possible that no photograph is changed.

(15) The photographs should be protected by the photoviewing change device against sweat from the fingers and against dust.

(16) It is a requisite that the photo-viewing change device be compact, that it should take up only a small amount of space and that a large part of its volume, if possible the majority of its volume, should be occupied by the photographs themselves.

(17) As far as possible the entire face of the exposed picture should be visible, that is to say it should be covered very little, or not at all.

(18) It should be possible to make an annotation for the purpose of indicating the contents.

(19) It must also be possible to insert the photographs into the photo-viewing change device by machine, especially automatic machines, which insert the photographs, close the photo-viewing change device and effect an operation check.

(20) The mechanism of the photo-viewing change device should permit various forms of arrangement, wherein in one arrangement it should be possible to remove the photos from the pile from above and reinsert them from below, whereas in another arrangement it should be possible, conversely, to remove the photos from the pile from above and reinsert them from below; if desired a mechanism should be available by means of which it is possible to remove a photo from inside the pile, for example, to remove the uppermost picture from the pile not from above but from its underside.

The requirements listed above in relation to a photo-viewing change device apply also to other sheet-like and card-like objects, which are referred to hereinafter as "sheets", for example cards containing cookery recipes, or information cards for ski pistes, walking routes or the like, and index cards from short card indexes, to mention but a few examples. In addition, the above requirements are also at least partially relevant to change devices for cards containing information that is not visible; for example, it is conceivable that by means of such a change device magnetic cards, containing language lessons, could alternately be brought in front of a simple, for example, battery-operated, magnetic head scanning mechanism, securely attached, for instance, to the change mechanism.

Consequently, the invention does not relate exclusively to a photo-viewing change device, although it is preferably to be used for photographs, but relates in general to a device for the alternate exposure of individual sheets from a pile of sheets. By means of the invention a device of this kind shall be provided with which at least some, but preferably all, of the above requirements are met and with which the disadvantages of the above state of the art are overcome.

The device provided by the invention, which is constructed in the manner mentioned at the beginning, is characterised in accordance with the invention in that the sheet edge bearing face, at least in that part which is adjacent to the sheet edge portion of an end sheet of the pile of sheets, includes an acute angle with that face of the end sheet which is at the pile side, and there has at least at one or more areas, preferably along the entire edge portion of the sheet, an extended portion which extends at least as far as the boundary, facing outward from the pile, of the sheet edge portion, but which preferably extends at this boundary beyond the pile.

By means of this arrangement, particularly reliable separation of a single sheet from the pile of sheets is achieved each time without the risk that either no sheet will be separated from the pile or several sheets will simultaneously be separated from the pile. This device operates particularly reliably even when the sheets are of relatively large dimensions and have thickness tolerances.

The device according to the invention can be so arranged that it is provided with at least one separating stop which is arranged on the side of the end sheet facing outward from the pile and is adjacent to the extended portion but spaced therefrom, which stop is so arranged or is so adjustable that the projection of the stop face lies parallel to the face of the end sheet lying between the separating stop and the extended portion, within the extended portion, wherein in the region between the separating stop and the extended portion a separating space is provided into which the edge portion of the end sheet bends so that the sheet can be separated from the adjacent sheet.

Furthermore, the construction of the device according to the invention may be such that the distance between the extended portion and the end, facing it, of the stop face is small with respect to the sheet length or breadth extending perpendicular to the sheet edge bearing face or, that the frictional force transmitted between the sheet to be removed and the sheet adjacent thereto is small with respect to the bending force necessary to bend the sheet edge portions at the sheet edge bearing face so as to introduce the sheet edge portion into the separating space.

Preferably the device is so designed that the extended portion is adjacent to a removal aperture, especially a removal slot, the width of which is somewhat larger than the thickness of one sheet and the length of which is somewhat larger than the length of the edges of the sheets extending parallel thereto.

In a simplified embodiment, which nevertheless operates reliably, there may be provided in the region of, or instead of, the separating stop, an open access means, by means of which pressure, especially finger pressure, can be exerted on the end sheet that is at the removal slot side, as a result of which pressing components lying in the plane of the sheet can push the sheet out through the removal slot.

The device according to the invention may furthermore have a sheet insertion means for inserting a sheet into the pile, especially for reinserting a sheet that has been removed from the pile. In particular, the construction may be such that the sheet edge bearing face, at least in that part which is adjacent to the sheet edge portion of the other end sheet of the pile, has at one or more areas, preferably along the entire edge of the other end sheet, an extended portion which extends at least as far as the boundary, facing outward from the pile, of this sheet edge, but which preferably extends at this boundary beyond the pile of sheets, wherein bordering on this boundary and on the outer side, adjacent to it, of the pile, an insertion space is provided through which the edge portion of a sheet entering into the pile can be pushed into the pile without interference by the edges of the sheets disposed in the pile. The device can in this case be so designed that there is provided on the side, facing outwards from the pile, of the other end sheet and adjacent to the extended portion disposed there, as well as spaced therefrom, at least one insertion stop which is so arranged or so adjustable that the projection of its stop face is parallel to the face of the end sheet lying between the insertion stop and the extended portion adjacent to it, within the extended portion, wherein preferably the distance between the extended portion adjacent to the other end sheet and the end, facing the extended portion, of the stop face of the insertion stop is small in relation to the sheet length or breadth extending perpendicular to the sheet edge bearing face. In particular, the construction is such that the extended portion adjacent to the other end sheet extends to an insertion aperture, especially an insertion slot, the width of which is somewhat larger than the thickness of one sheet and the length of which is somewhat larger than the length of the edges of the sheets extending parallel thereto.

Preferably the sheet edge bearing face includes, at least in the region of its extended portion at the slot side, an acute angle with the face, facing outward from the pile, of the other end sheet. Furthermore, there is preferably arranged on the side of the pile of sheets that is remote from the sheet edge bearing face a counter sheet edge bearing face, which includes an acute angle with the face, facing the inside of the pile, of the sheet at the insertion slot side.

The above-mentioned acute angle may be between 30° and 60°, preferably between 45° and 60°, wherein it is especially preferably between 40° and 45° and is preferably 42°.

The sheet edge bearing face, including its extended portion and/or the counter sheet edge bearing face, are preferably planar, and in particular the sheet edge bearing face and the counter sheet edge bearing face are complementary to one another, so that the sheets of the pile are arranged at two opposite lying edges between two parallel bearing faces.

For the purpose of inserting and removing the pile of sheets the counter sheet edge bearing face may be provided on a rotatable component, preferably an essentially wedge-shaped component, which is pivotable about an axis parallel to the sheet edges and of which the face opposite the counter sheet edge bearing face preferably forms a side wall of a housing accommodating the sheets. The removal of the pile of sheets is simplified if the wedge-shaped component has at its tapered end a lug engaging beneath the pile which when pivoted lifts the pile out of the normal position.

Furthermore, a locking means is provided for locking the wedge-shaped component in its normal position. In a preferred arrangement, the locking means comprises a plane face, which is preferably a face of the base of a housing accommodating the pile of sheets; and furthermore, this locking means has a counter plane face provided at the opposite side of the rotatable component, which face, in the direction of rotation opposite to that for pivoting the component out of its normal position, becomes a curved face, the radius of curvature of which diminishes to a radius that is equal to the distance between the axis of rotation of the component and the plane face. The counter plane face may in the direction of rotation in which the component is pivoted out of its normal position, become the afore-mentioned lug.

In addition, the rotatable component may have one or more protuberances, which in the normal position of the component engages or engage over the adjacent edge of the pile of sheets.

The separating stop may be in the form of a roll or roller, especially a rubber roll or roller, of the shifting means for moving the sheet at the removal slot side, or such a roll or roller can be provided in addition to one or more separating stops and have the function merely of shifting the mentioned sheet. In a particularly simple embodiment the roll or roller may be accessible by hand at the side remote from the pile of sheets in order to rotate it. So that the roll or roller can be adapted to various numbers of sheets inside the device according to the invention, its axis, which extends parallel to the removal slot, is movable perpendicular to or at an angle to the pile of sheets and when the device is empty the roll or roller is itself movable to the support face for the sheets.

The material of the roll or roller is so selected that the coefficient of friction between its surface and the sheet side facing it is large in comparison with the coefficient of friction between adjacent sheets. This may also be the case for other rolls and rollers to be mentioned hereinafter.

The roll or roller is preferably mounted on a loop, which is pivotable about an axis of rotation that extends parallel to the removal slot and is arranged so that it can be countersunk in the base of a housing accommodating the pile of sheets. This loop not only permits the aforementioned adaptation of the roll or roller to the number of sheets disposed in the device according to the invention, but can be used to stand up the housing in which the pile is disposed, so that the device according to the invention can be stood like a table picture frame. In order that it may be stood up both in the horizontal and upright position, the loop acting as an element for adjusting the angle of inclination can be pivoted into and locked in a first and second position, wherein in the first position it extends at an acute angle and in the second position it extends at a right angle to the pile of sheets.

The device according to the invention can in particular be so arranged that one or more separating stops are provided on the support face for the pile of sheets and one or more insertion stops are provided on a counter support face, which is arranged on the side of the pile of sheets that is opposite the support face; or vice versa.

The support face for the pile of sheets may especially be provided on the inner side of the essentially transparent lid of the housing, or essentially formed by this inner side, whereas the counter support face is provided on the base of the housing or is essentially formed by this base.

Preferably the counter support face is provided at a pressure plate resiliently pressing the pile of sheets against its support face. An arrangement that is particularly space-saving is produced by providing a conical spiral spring for pressing the pressure plate on its side remote from the pile of sheets, because this spiral spring is compressible to its material thickness. It is, however, also possible, for the counter support face to be formed by one, two or more rolls or rollers, especially rubber rolls or rollers, which resiliently press the pile of sheets against its support face. The counter support face may also be formed by a resilient plate made of resilient steel or resilient plastics material, wherein the afore-mentioned conical spiral spring is replaced by one or more spring members preferably formed in one piece with the resilient plate, especially resilient tongues, and wherein furthermore the insertion stop is a resilient member likewise preferably integrally formed with the resilient plate. This resilient member may be a resilient tongue and have a greater resilience than the remaining resilient plate, which may be achieved, for example, by making it thinner than the rest of the resilient plate.

The separating stops and/or the insertion stops may advantageously be resiliently formed.

For the semi-automatic or fully automatic reinsertion of a removed sheet, the device according to the invention is so designed that a slider member is provided, which is movable perpendicular to the removal slot to such an extent that it completely accommodates, on removal transport faces provided therefor, the sheet emerging from the slot, wherein it furthermore has insertion transport faces for supporting the sheet when it is introduced into the insertion slot. In detail, for its back and forth movement the slider member is mounted and guided on the sheet pile holding means or on a housing formed by this or arranged on this. The slider member has a frame, which extends along those lateral edges of the pile that extend in the direction of movement of the slider member.

There are provided on the slider member, in the region of the lateral edges of the removed sheet, springs, especially leaf springs, which extend in the direction of movement of the slider member and push the sheet emerging from the removal slot into the plane of the insertion transport faces of the slider member. These springs, provided on the slider member, are, in the vicinity of the removal slot, designed as a separating stop, preferably in such a manner that they form a curved projection which is in each case a resilient separating stop. These springs are each guided in a recess, which is provided in a defining face of the removal slot, which in turn is arranged on the pile holding device or a housing accommodating the pile.

The removal slot and/or the insertion slot may be formed between a first removal slot or insertion slot limiting member provided on the housing and a second removal slot or insertion slot limiting member provided on the slider member. In particular, the first removal slot or insertion slot limiting member may carry the sheet edge bearing face and for this purpose especially be in the form of a wedge. The second removal slot limiting member may be a plate provided on the slider member, especially a transparent cover plate, which when the slider member is not in the drawn out state forms the housing lid, whereas the second insertion slot limiting member may be formed by one or more slider member parts extending in the direction of movement of the slider member, or vice versa.

In a particularly preferred embodiment a grab member is provided on the slider member which transports the end sheet, at the removal slot side of the pile. The grab member can be designed in a wide variety of manners, for example, it may have a suction means connected to a vacuum pump which can be operated and controlled by movement of the slider member. A particularly simple design, however, is where the grab member is in the form of a projection, which engages with the rear edge, disposed in the vicinity of the counter sheet edge bearing face, of the end sheet at the removal slot side of the pile.

To pre-sort and pre-separate from the underlying sheet the sheet to be transported, the counter sheet edge bearing face has in the region of the rear edge of the end sheet at the removal slot side, two step-like shoulders having a step height that is somewhat larger than the thickness of one sheet. The step-like shoulders may be provided on the above-mentioned, rotatable, especially wedge-shaped, component.

The shifting device for shifting the sheet to be removed and/or inserted may also be so designed that it has one or more friction rollers which engage on the sheet edge portions lying at the side of the removal or insertion slot.

The housing, which accommodates the pile of sheets, has a push-on or hinged lid, which for observing and/or reading the sheets is completely or at least predominantly transparent. This housing may be provided with one or more stacking means for stacking several similar housings; it is possible to use a wide variety of stacking means that are known per se. It has proved particularly simple and advantageous if the housing is provided with stacking grooves and protuberances.

In certain embodiments of the invention the slider member is so designed that the lid of the housing is attached to the slider member and together with this can be moved parallel to the sheet faces so far out of the housing at one side that in its outermost position it still remains on the housing and engages over a pile of sheets by a predetermined length.

This part that overlaps the pile of sheets acts in one of the preferred embodiments as a base for a so-called insertion stop, the function of which is explained above in greater detail. On the other hand this overlapping part serves to prevent the pile of sheets from falling out at one side when the slider member has been pulled out of the housing to the furthest possible extent and the housing faces downwards with its aperture, which may be the case, for example, when the sheets, such as, for example, photos, are observed by a person lying on his back. In the cases in which the overlapping part is to have not just the first of the two afore-mentioned functions, there are provided on the side wall lying opposite the slider member one or more protuberances engaging over the pile of sheets, since the pile of sheets can only effectively be prevented from falling out when members engage over it from two opposite-lying sides. The latter side wall may even itself engage over the pile of sheets.

Although it is in principle preferable that the pile is overlapped, at the side at which the slider member can be pulled out of the housing, by the slider member when the slider member is in its outermost position, because the slider member must anyway, in order that it remains permanently in the housing, not be fully extractable from the housing, it is in principle also possible to so design the slider member that it can be pulled out to such an extent as to no longer engage over the pile in its outermost position and instead, the pile of sheets, when the slider member is drawn out from the side of the housing at which the slider member can be pulled out, is overlapped by the housing itself or by one or more protuberances arranged on the housing.

In all of these cases the overlapping parts make it difficult to remove the pile of sheets from the housing or to insert a sheet into an empty housing even when the slider member is pulled out of the housing as far as possible.

By means of the invention the afore-mentioned embodiments according to the parent application are so designed that in the fully withdrawn position of the slider member, in spite of the parts that engage over the pile, a pile can easily be removed from the housing or inserted into the housing.

This is achieved in accordance with the invention in that the side wall of the housing that lies opposite the slider member is attached to an additional slider member which is held on the housing by a locking means and on operation of this means can be pulled out of the housing somewhat further than the predetermined length by which the pile of sheets is overlapped at the slider member side in the fully drawn out position of the slider member.

In this manner the pile of sheets can, at the slider member side, be lifted past the overlapping parts out of the housing and removed, or inserted into the housing, wherein in the latter case it is previously pushed under the overlapping parts provided on the side of the housing lying opposite the slider member, that is, preferably provided on the additional slider member.

The locking means may in detail be so designed that it has a retaining catch attached to the additional slider member and engaging in a notch stop in the housing. This retaining catch may be arranged on a tongue in such a manner that by pivoting the tongue it can be brought out of engagement with the notch stop in the housing. The design and operation of a locking means designed in this manner are particularly simple if the retaining catch is held in engagement with the notch stop in the housing resiliently, especially by the inherent resilience of the tongue, so that by applying pressure on the tongue towards the inside of the housing it disengages from the notch stop.

This device may furthermore be so designed that a pile to be removed, as it is released is also automatically lifted so far out of the housing that it can be taken hold of without any difficulty. This can be achieved as a result of the fact that when the tongue is pivoted for the purpose of disengaging the retaining catch from the notch stop, the side of the tongue facing the pile of sheets engages with the pile of sheets and is pivotable so far towards the inside of the housing that the pile is preferably completely pushed out of the housing at one side.

So that the pile of sheets, when the additional slider member is drawn out, is at the same time drawn forwards under the overlapping part at the slider member side, the tongue may be provided, at the area at which it engages with the pile of sheets, with an engaging face of high friction, and this engaging face of high friction may be formed by a frictional element, especially a rubber platelet, attached to the tongue. Such an engaging face of high friction further has the purpose, in its position pressing against the under side of the pile of sheets, of holding in fixed position the sheet of the pile that would otherwise be drawn out by the withdrawal of the slider member by means of its grab elements. These grab elements, as described in detail in the parent application, may be, for example, grab lips or free-running rolls or rollers consisting of a material of high friction, the rotation of which is hindered when a sheet is removed from the pile so that they push out of the housing the sheet to be removed by means of the frictional engagement between them and the sheet. The high friction, which is exerted on this sheet per se by these grab elements for the purpose of removing a sheet from the pile, can be overcome by corresponding strong pressure by the engaging face of high friction, which is disposed on the tongue, against the pile of sheets, so that the grab members slide past over the sheet, held back by a relatively strong force, which they would otherwise take along when the slider member was pulled out.

For improved and more reliable operation of the tongue, a recess for the engagement of a finger may be provided in this tongue, by means of which the pressure for pivoting the tongue and for taking hold of the pile of sheets with the tongue is exerted. Since the tongue is generally operated from the base of the housing, whereas the user has the upper side of the housing in his view and therefore cannot see at all at which position he must operate the tongue, this recess on the one hand enables the user to find the tongue easily by feeling for it, and on the other hand unintentional operation of the tongue is avoided because the user can quite easily avoid engaging his finger in this recess if he does not want to operate the tongue, since he would obviously notice immediately if his fingers were unintentionally to come into the region of the recess.

Since the tongue is advantageously arranged towards the inside of the housing from a gripping face, which serves to hold the housing during the operation of the slider member, the automatic differentiation between the gripping face and the finger engagement recess disposed next to it by feeling with the fingers is very important, especially when the finger engagement recess is arranged directly next to the gripping face, which for handling purposes is very practical, because the user, when he wants to change over from changing the sheets to removing the pile, need only move his finger, which is resting on the gripping face next to the finger engagement recess, a little towards the inside of the face of the housing base.

So that the pile of sheets is pressed out at the correct side of the housing, that is to say, at the side at which it has been pulled forwards under the overlapping part of the slider member, or where applicable of the housing, by means of the tongue on operation of the additional slider member, the tongue can with its free end, at which the engagement face by means of which it is pressed against the sheet is provided, extend in the direction of the slider member beyond the center of the housing. In this manner, the pressure exerted by the tongue acts on the side of the pile facing the slider member that serves to rearrange the layers of sheets in the pile.

A particularly simple structural arrangement may be achieved by providing the tongue in a, preferably likewise tongue-shaped, guide member of the additional slider member, which slider member is displaceable along guide faces in the housing, especially in the base of the housing, in the direction of movement of the additional slider member. This guide member and the guide faces may thus alone be adequate as a guide member for the additional slider member without it being necessary to provide further guides for the additional slider member.

Finally, it is advantageous to provide on the guide member a stop which serves to limit the movement of the additional slider member out of the housing, as it cooperates with a counterstop on the housing, especially on the base of the housing.

It is pointed out here that the invention can be used not only for a device of the type mentioned hereinbefore, but also fundamentally in all cases where a device is used for the alternate exposure of individual sheets from a pile, especially a photo-viewing change device, in which a housing is provided which accommodates the pile of sheets, wherein the base of the housing extends parallel to the sheet faces and the side walls of the housing laterally surround the pile, and wherein, furthermore, the lid of the housing is attached to a slider member and together with this parallel to the sheet faces, can be pushed at one side of the housing so far out of the latter that it still remains on the housing in its outermost position and engages over the pile by a predetermined length, or the pile of sheets, when the slider member is drawn out, is overlapped by a predetermined length from the side of the housing at which the slider member is drawn out, wherein finally, preferably at the side wall lying opposite the slider member, one or more protuberances engaging over the pile are provided and/or this side wall itself engages over the pile.

In principle the invention can even be used successfully in all devices that hold a pile of sheets or a single sheet in each case at two opposite-lying sides by overlapping protuberances, rims or the like, of which one rim, protuberance or the like is fixed, whereas the other, in accordance with the invention, is attached to a slider member which corresponds to that slider member referred to above as the "additional slider member".

Further advantages and features of the invention are disclosed in the following description of the figures and in the patent claims.

The invention is explained in detail in the following by way of a few particularly advantgeous forms of construction shown in principle in the drawings.

FIG. 1c is a perspective view, which corresponds to FIG. 1b but which has a device for removing the sheets which differs from that according to FIG. 1b;

FIG. 1d is a section through a particularly advantageous embodiment of a transport roller, which can be used in the devices according to FIGS. 1b, 1c and 1f as well as in other embodiments that have transport rolls or rollers;

FIG. 1e shows in principle a further possible modification of the device for removing sheets for use in the device according to the invention according to FIG. 1a;

FIG. 1f is a schematic section representation which shows a possible modification of the device according to FIG. 1c;

FIGS. 2a–2c are schematic representations for illustrating the method of operation of the embodiment shown in FIG. 1a, wherein the sheets of the pile of sheets have been shown disproportionately large in cross-section to assist explanation;

FIG. 3a is a perspective view of a second embodiment, in which in this Figure essentially only the differences from FIG. 1a are shown;

FIGS. 3b and 3c show a possible modification of the embodiment according to FIG. 3a, which permits reintroduction of a removed sheet without the use of the springs, shown in the embodiment according to FIG. 3a, to lift the sheet;

FIG. 4a is a longitudinal section through a third embodiment according to the invention, which pemits a fully automatic removal and reintroduction of a sheet;

FIG. 4b is a perspective view of the embodiment according to FIG. 4a viewed from above at an angle and partially in section;

FIG. 4c is a view, enlarged in comparison with FIG. 4a, of the rotatable wedge-shaped component of the device according to FIG. 4a and 4b;

FIG. 4d is an enlarged representation of the grab member of the device according to FIGS. 4a and 4b;

FIG. 4e is a sectional view of a modified embodiment of the housing lid, disposed on the slider member, of the device according to FIGS. 4a and 4b;

Figure 1A:
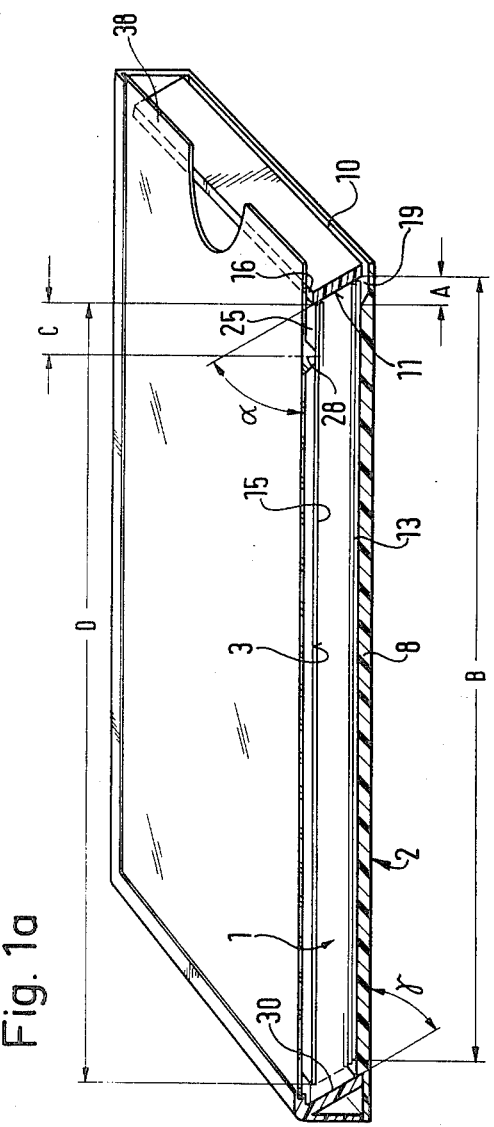
FIG. 1a is a perspective view of a first embodiment of the invention, shown at an angle from above and partially in section.
Figure 1B:
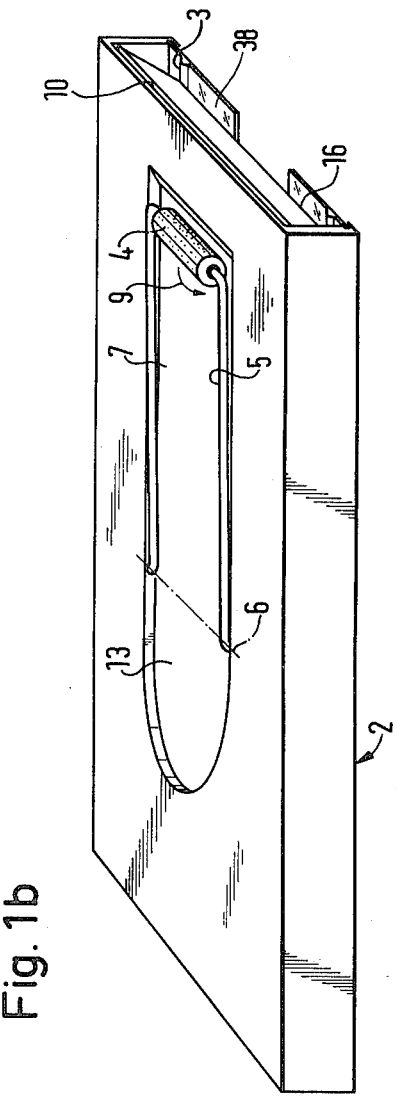
FIG. 1b shows in perspective representation the embodiment of FIG. 1a at an angle and from below.
Figure 6:
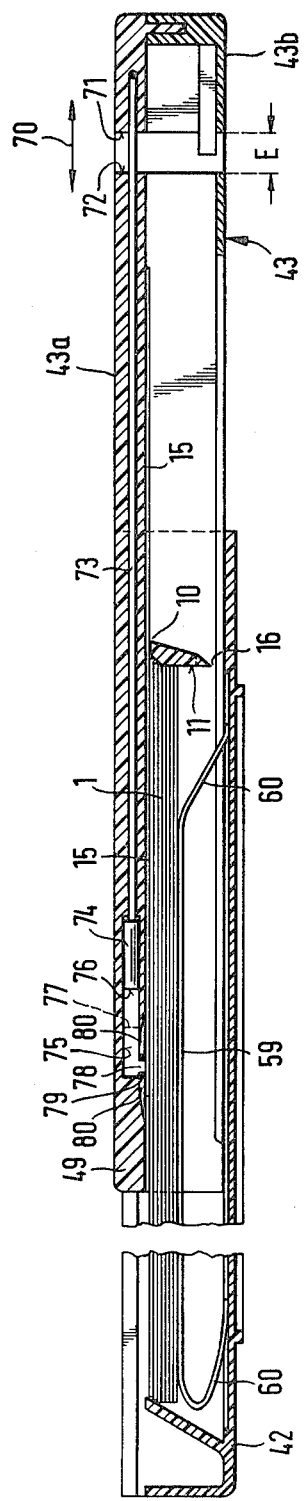
Figure 7A:
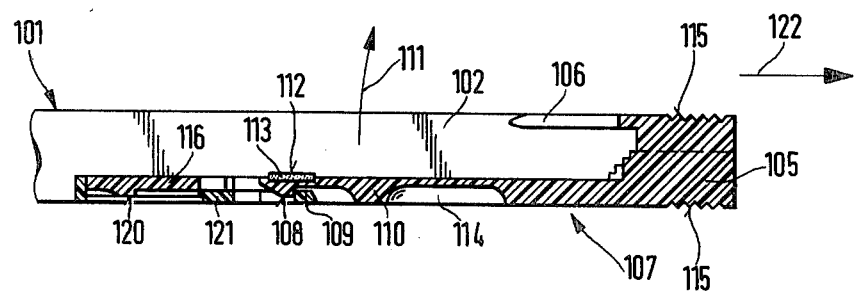
Figure 7B:
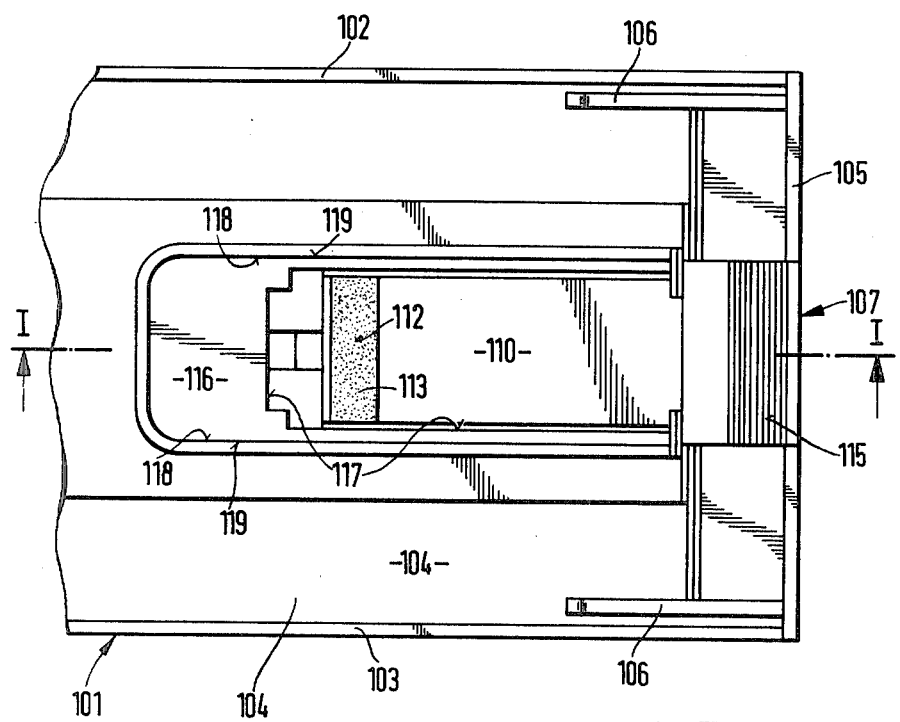
Figure 7C:
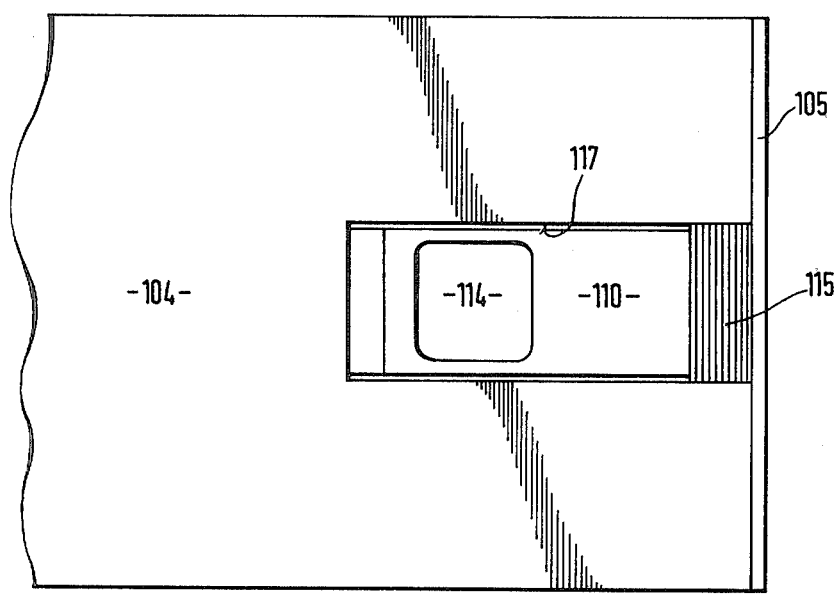
Figure 8A:
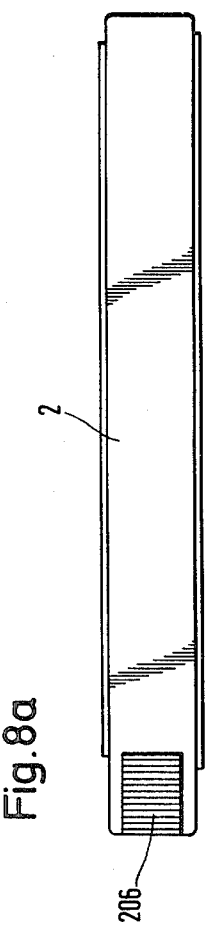
Figure 8B:
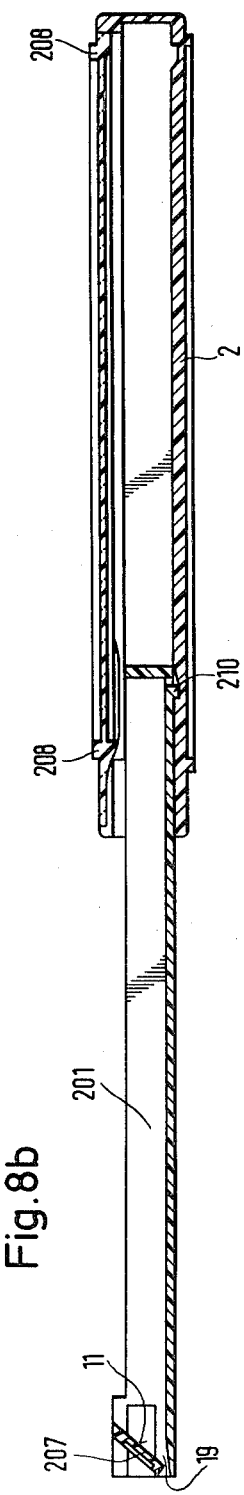
Figure 8C:
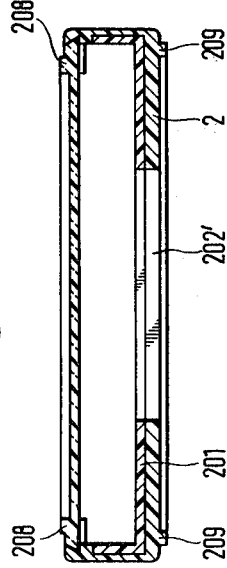
Figure 8D:
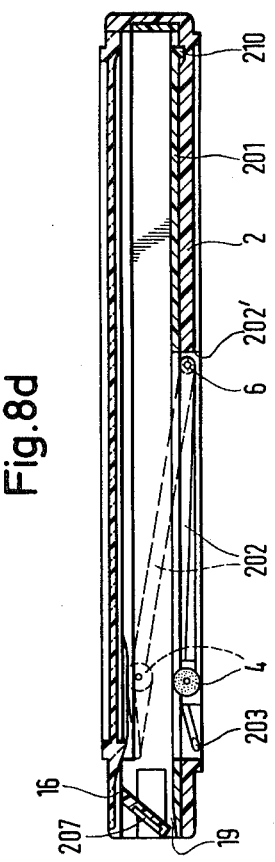
Figure 8E:
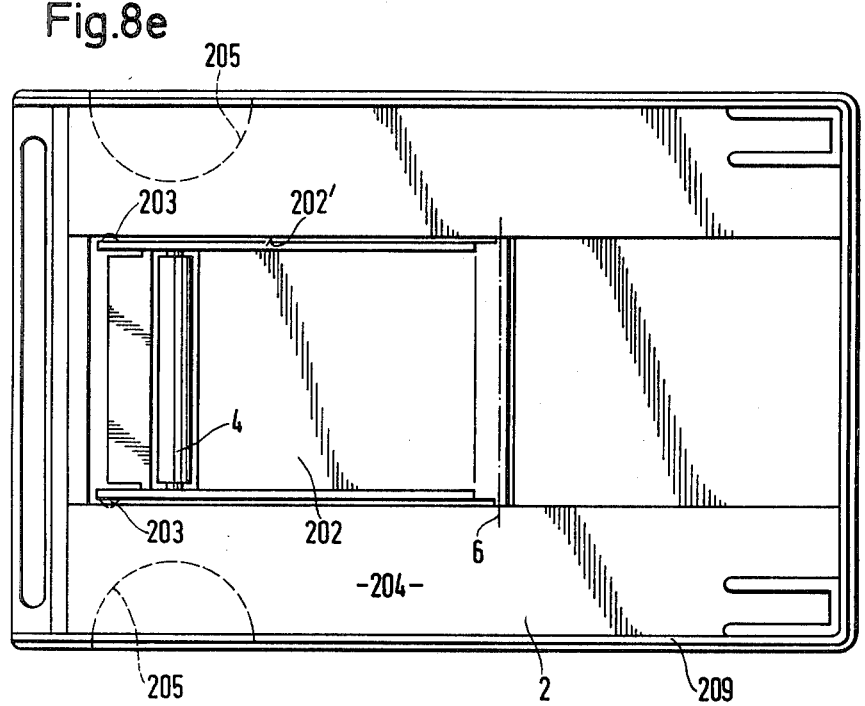

FIG. 6 is a longitudinal section through a sheet change and viewing device, in which the uppermost sheet of a pile of sheets is held fast to a slider member by suction means and is drawn by the slider member out of the housing, in which the pile of sheets is disposed, and when the slider member is inserted is pushed, as the lowermost sheet, back into the pile of sheets, the sucking means being operated by the movement of the slider member;

FIG. 7a is a longitudinal section through a slider member, which has a locking means, wherein a portion of the housing is visible which can accommodate a pile of sheets and the locking means is disposed in the position in which it prevents the slider member from being drawn out of the housing;

FIG. 7b is a plan view of the slider member with the locking means and shows a portion of the housing from above, without the pile of sheets, wherein the slider member is disposed in the position shown in FIG. 7a;

FIG. 7c is a plan view of the slider member and a portion of the housing from below, and the slider member is likewise disposed in the locked position;

FIG. 7d is a sectional view corresponding to FIG. 7a, wherein, however, the slider member has been drawn out of the housing almost as far as is possible; and FIG. 7e is a view corresponding to FIG. 7b, in which the slider member is in the position shown in FIG. 7d;

FIGS. 8a to 8f show an embodiment similar to the embodiment in FIG. 1b but modified in comparison with this, which in addition to other modifications in particular has a drawer for the complete removal of the pile of sheets; in detail in FIG. 8a shows a side view of this embodiment;

FIG. 8b is a longitudinal section through this embodiment with the drawer drawn out and without the roll or roller FIG. 8c is a cross-section through this embodiment;

FIG. 8d is a longitudinal section with the drawer closed and with the roll or roller provided for transporting the sheets;

FIG. 8e is a plan view from below and

Figure 8F:
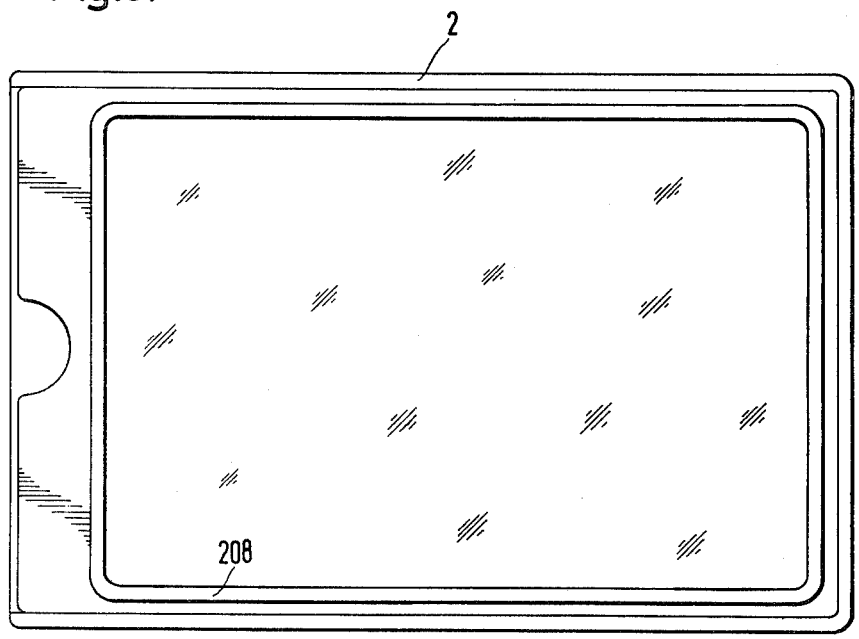
Figure 9A:
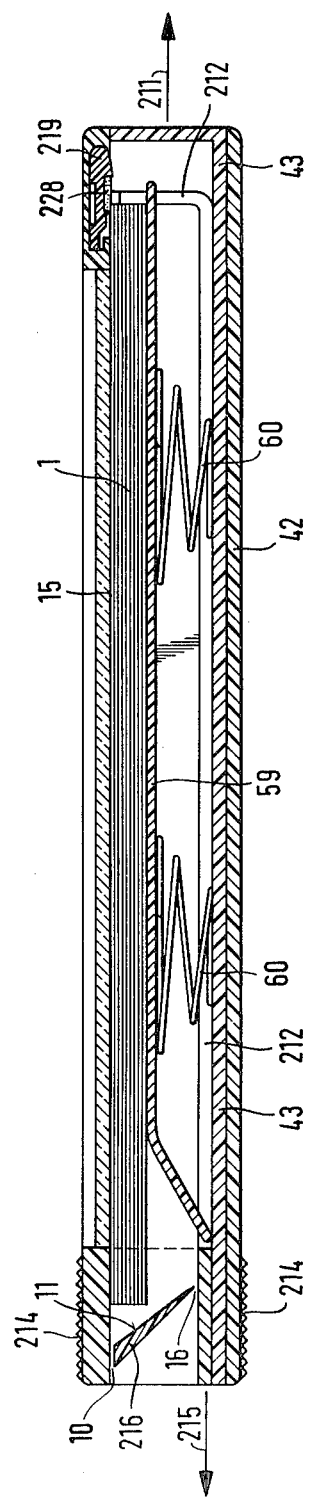
Figure 9B:
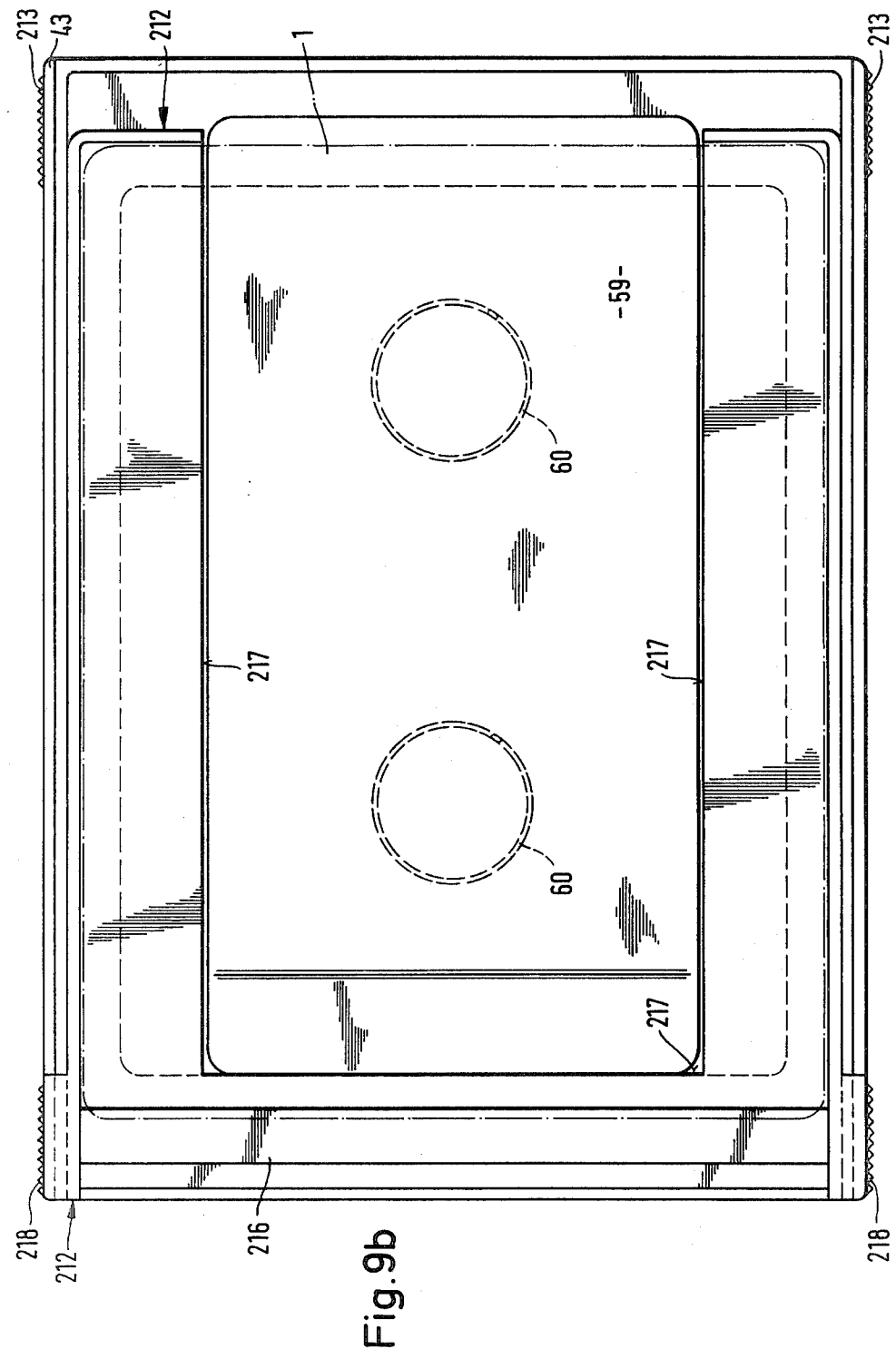
Figure 10A:
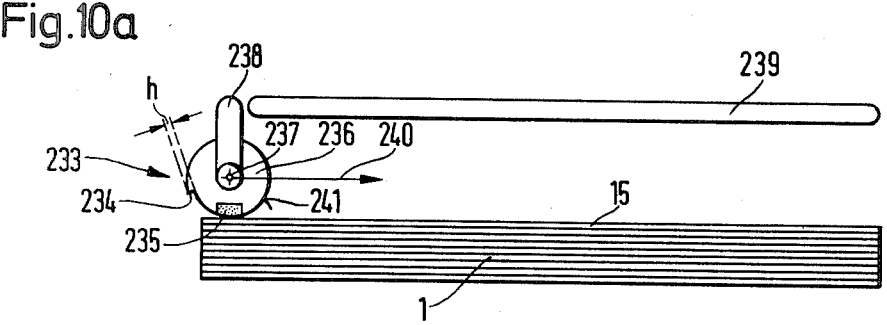
Figure 10B:
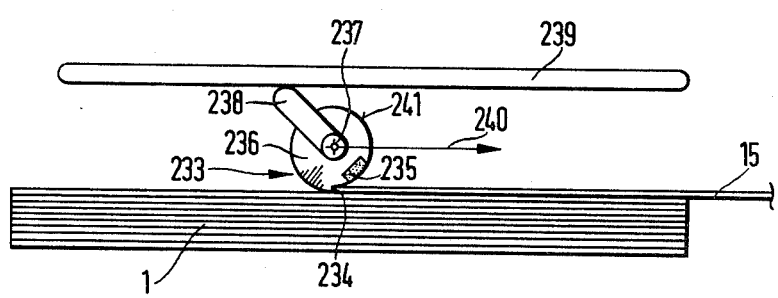
Figure 10C:
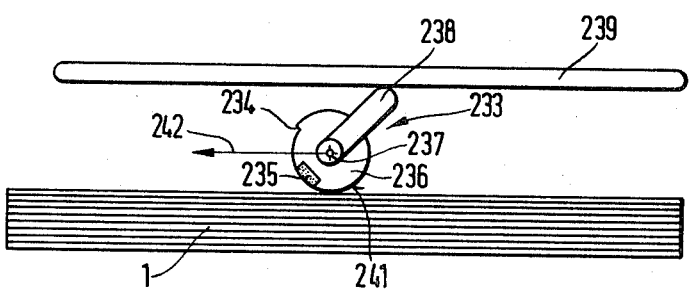
Figure 11A:
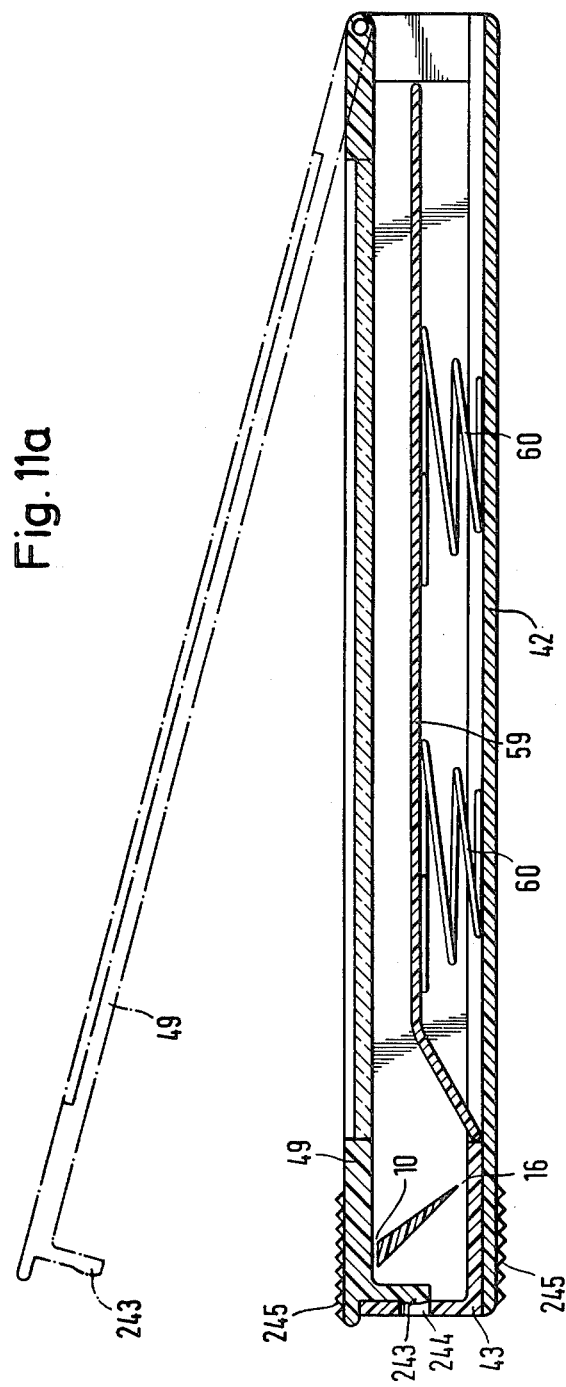
Figure 11B:
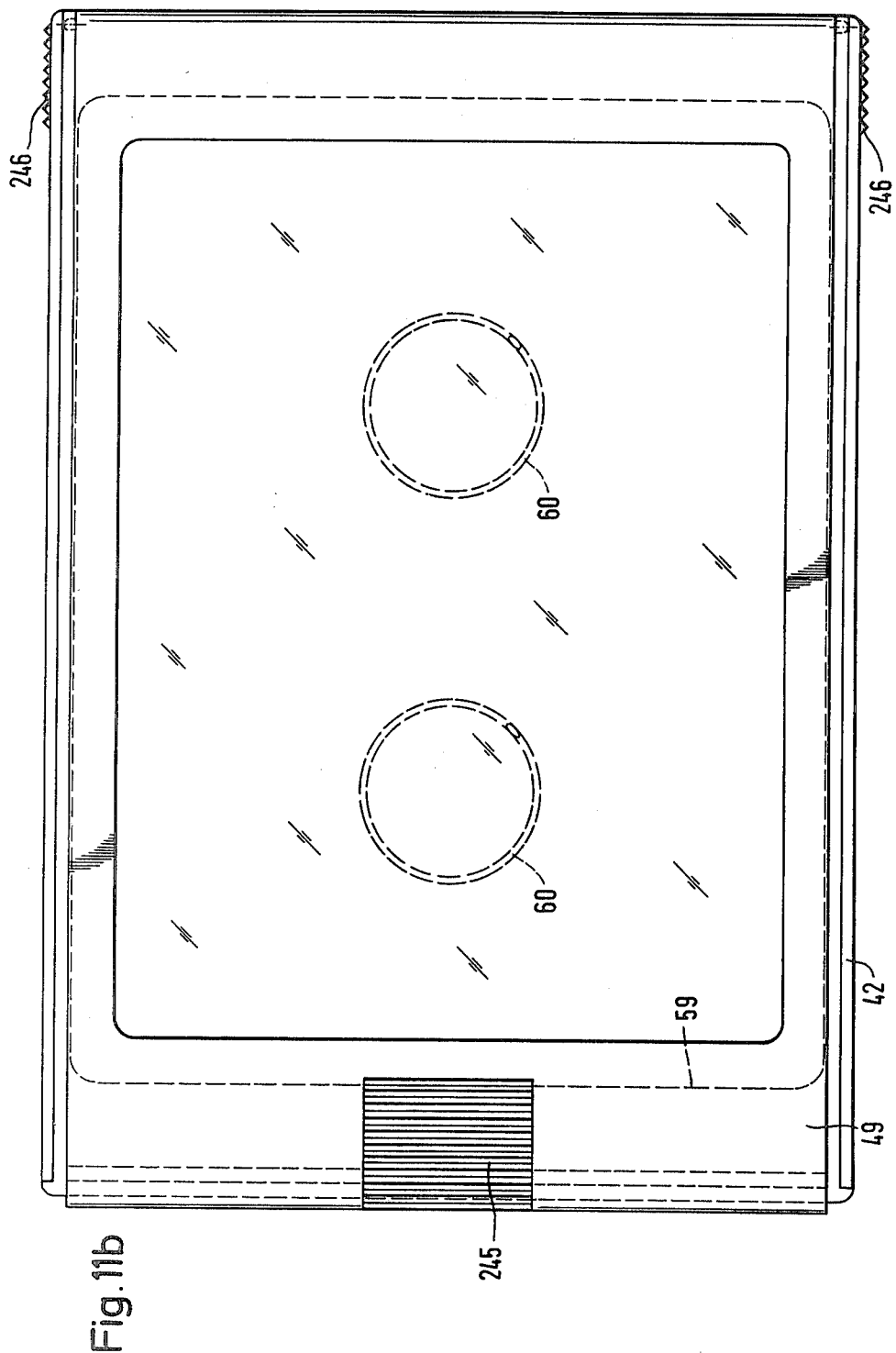
Figure 13:
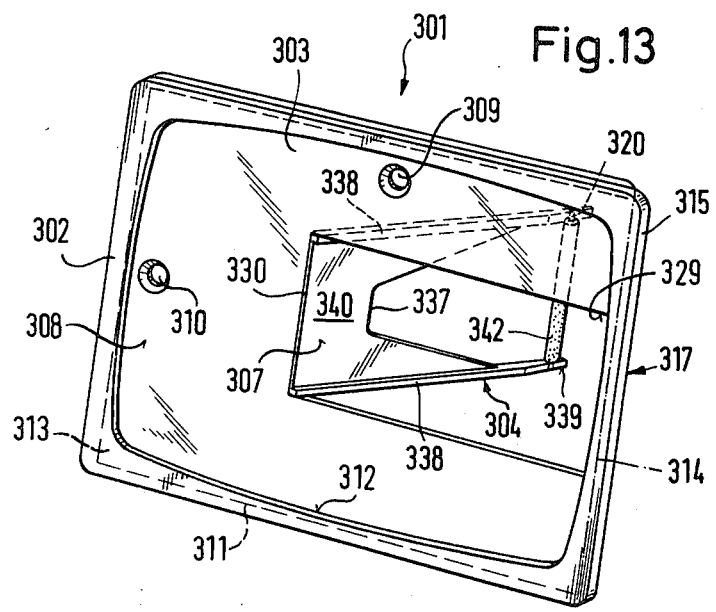
Figure 14:
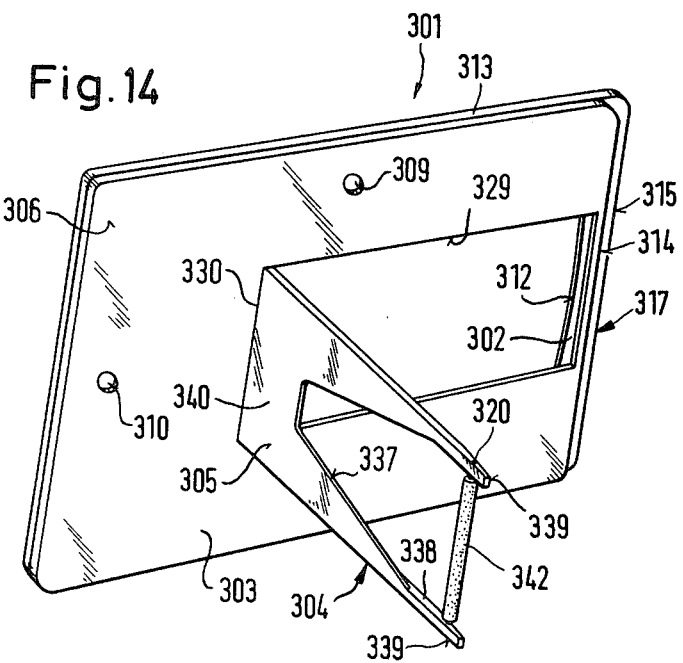
Figure 20:
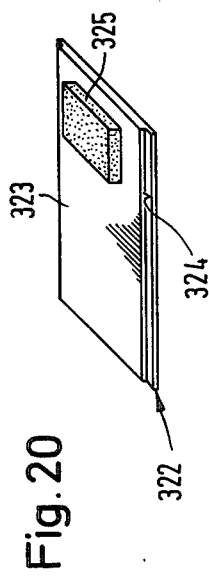
Figure 21:
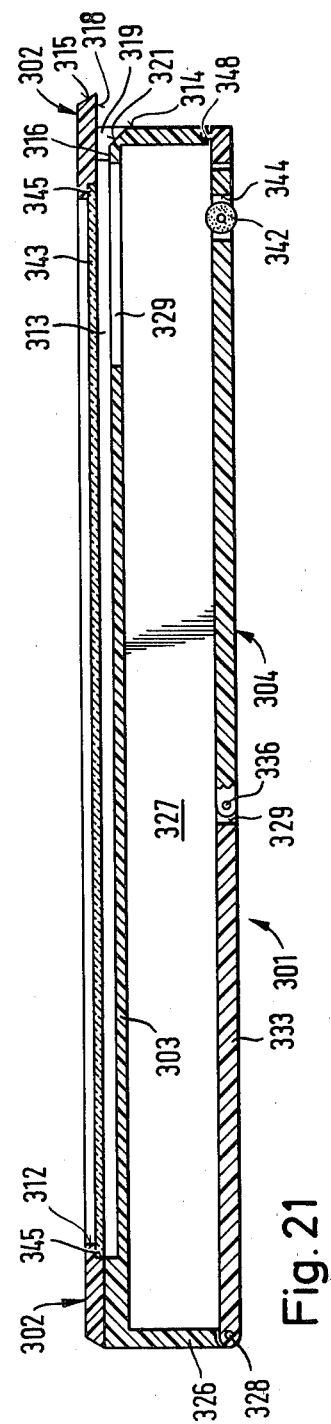

FIG. 8f is a plan view from above;

FIGS. 9a to 9d show a modified embodiment of the device according to FIGS. 4a to 4g, in which a hook is likewise provided as transporter element, which hook is not, however, disposed on the slider member but on the lid of the housing, and furthermore, a drawer is provided for the complete removal of the sheets. In detail;

FIG. 9a is a longitudinal section through the embodiment;

FIG. 9b is a plan view from below;

FIG. 9c is a representation of the hook-shaped transporter element in longitudinal section and on a larger scale than in FIG. 9a and FIG. 9d is a cross-section through the hook-shaped transporter element;

FIGS. 10a to 10c show various positions of a movable transporter element by means of which the uppermost sheet of a pile of sheets is moved along in the first phase exclusively by means of a retentive element and in the further phases by means of a hook;

FIGS. 11a and 11b show an embodiment in which the entire removal of the pile of sheets is possible by opening up a hinged lid; FIG. 11a shows a longitudinal section through this embodiment, in which the hinged lid is shown n its opened up position by broken lines; and FIG. 11b shows a view of this embodiment from above;

FIGS. 12a and 12b show an embodiment which can be particularly well produced in one piece; FIG. 12a shows a longitudinal section through this device with the lid opened and FIG. 12b shows a plan view of this device;

FIG. 13 is a front view, in perspective, of a first example of an embodiment of a picture carrier standing on a flat surface;

FIG. 14 is a rear view, in perspective, of the picture carrier of FIG. 1 standing on a flat surface;

FIG. 15 shows in plan view and partly in section, a prop which can be attached to the rear wall of a picture carrier;

FIG. 16 is a section along the line I—I through the prop shown in FIG. 3;

FIG. 17 is a plan view of a serrated ring to lock the position of the prop shown in FIGS. 3 and 4;

FIG. 18 is a longitudinal section through a second example of an embodiment of a picture carrier according to the invention;

FIG. 19 is a cross section along the line II—II through the picture carrier shown in FIG. 6;

FIG. 20 is an embodiment of a transporter slider member in perspective view; and FIG. 21 is a section through a third example of an embodiment of a picture carrier according to the invention having a compartment for receiving additional pictures.

DETAILED DESCRIPTION

FIG. 1 will be dealt with in detail first of all; the illustrated device for the alternate exposure of individual sheets from a pile 1 of sheets, which may in particular be a pile of photographs, possesses a pile-holding device, which in the present case is in the form of a housing 2. This device furthermore has a support face 3, which extends parallel to the sheet faces and can be pressed against the sheet pile 1. In the embodiment according to FIG. 1, the sheet pile 1 is pressed against the support face 3 by the pressure of a drive roller 4, which is rotatably attached to a loop 5 made of metal or plastics material, which in turn is pivotable about an axis 6. This drive roller is disposed in an aperture 7 in the base 8 of the housing and can consequently be pressed by hand against the sheet pile 1, wherein it can be moved in to the inside of the housing 1 so that it can be adapted to a varying number of sheets in the apparatus, that is to a different height of pile 1. The driver roller 4 has the additional function of displacing the undermost sheet of the pile in order to remove this sheet, for which purpose it is merely necessary that the roller be turned by the user by one or more fingers in the direction of the arrow 9, while it is simultaneously pressed against the sheet pile 1.

In a much more simiplified embodiment even this drive roller can be omitted, the aperture 7 being made large enough for the user to press through the aperture 7 with his finger against the pile 1 and simultaneously transmit a pressure towards to the right in FIG. 1 against the lowermost sheet in order to displace it through the removal slot 10. For this purpose the aperture 7 may be in the form, for example, of a slot in that part of the housing 8 which is adjacent to the removal slot 10. This slot, which is slightly larger than finger width and extends in the longitudinal direction of the housing, is not shown in FIG. 1.

The device according to FIG. 1 has a sheet removal means for removing a sheet from the pile 1, and this sheet removal means has a sheet edge bearing face at one side of the sheet pile 1. The sheet edge bearing face 11 includes, at least in that part which is adjacent to the sheet edge portion 12 of the lower end sheet 13, an acute angle $\alpha$ with the face, at the pile side, of this end sheet. Preferably, this acute angle $\alpha$ is maintained constant over the entire height of the sheet pile, so that the sheet edge bearing face 11 is preferably a plane face inclined with respect to the transverse direction of the sheet pile 1, as shown in FIG. 1.

The sheet edge bearing face 11 adjoins, under the sheet edge portion 12 of the lower end sheet 13, the removal slot 10, the width of which is slightly larger than the thickness of a sheet and the length of which is slightly larger than the length of the edges, extending parallel thereto, of the sheets of the sheet pile 1. Slightly above the sheet edge portion 14 of the upper end sheet 15 of the sheet pile 1, the sheet edge bearing face 11 adjoins the insertion slot 16, through which a sheet removed through the removal slot can be reinserted into the sheet pile 1.

Figure 2C:
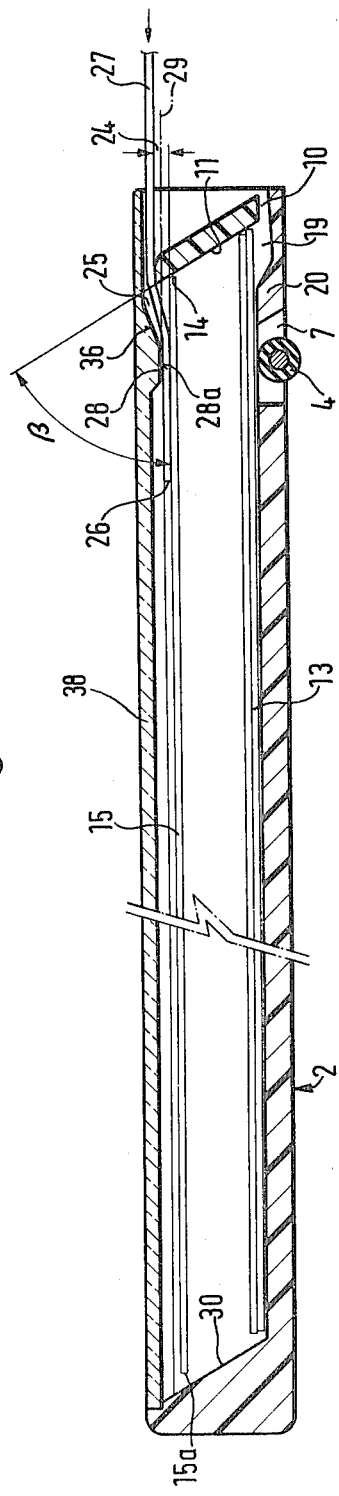

An important feature of the invention, which has already been mentioned briefly above and is explained in more detail in the following, especially with reference to the FIGS. 2a-2c, is that the sheet edge bearing face 11 not only engages the edge portion 35 of the sheet second from the bottom, but also has an extend portion 18, which extends at least as far as the boundary 12a facing outwards from the pile, i.e. the lowermost boundary, of the edge portion 12 of the lower end sheet 13, so that this sheet cannot normally, that is when there is no displacing force acting on it, pass out through the removal slot 10. Preferably the extended portion 18, as shown in FIG. 1, projects beyond this lower boundary of the edge portion 12 beyond the sheet pile 1. At the area that is adjacent to this extended portion 18 and to the underside of the sheet pile 1 that is adjacent thereto, a separating space 19 is provided in which the edge portion 12 of the lower end sheet 13 can be separated from the parallel edge portion 35 of the sheet second from the bottom that is adjacent to it, as explained in greater detail hereinafter.

Furthermore, a stop 20 is provided, which is called a separating stop because it assists the afore-mentioned separation of the sheet edge portion 12 from the sheet pile 1. This separating stop is so arranged that it engages with an area of the lower end sheet that is disposed a predetermined distance A from the removal slot 10. This distance A is small in comparison with the distance B between the sheet edge portion 12 at the removal slot side and the sheet edge portion 21 lying opposite thereto, of the lower end sheet 13 or, generally speaking, with respect to the dimension of the sheets of the sheet pile in the direction in which the sheets must be displaced when removed.

The separating stop 20 is furthermore so arranged that the projection 22 (see FIG. 2a), parallel to the sheet faces and provided on the stop face 23, lies within the extended portion 18 of the sheet edge bearing face 11. This ensures that the lower end sheet 13 cannot by itself, that is without the action of a displacing force, move through the removal slot 10, irrespective of the position in which the housing 2 is held.

Also in the region of the upper boundary at the insertion slot side of the sheet pile 1 an extended portion 24 of the sheet edge bearing face 11 is provided, which, before it reaches the insertion slot 16, extends at least as far as the boundary facing outwards from the pile, that is the upper boundary in FIG. 1, of the sheet edge portion 14 of the other end sheet 15, so that also the sheet edge portion 14 of the uppermost sheet is covered and the insertion of a sheet through the insertion slot 16 cannot be hindered. Preferably the extended portion 24 is so large that it projects beyond the upper boundary 14a of the sheet edge 14. Adjacent to this part of the extended portion 24 and to the upper side of the end sheet 15 which is adjacent to the extended portion 24, an insertion space 25 is provided through which the edge portion 26 (see FIG. 2c) of a sheet 27 entering through the insertion slot 16 can be pushed into the pile 1 without interference by the edges of the sheets disposed in the pile 1.

So that the sheet edge portion 14 of the upper end sheet 15 is held within the region of the extended portion 24 of the sheet edge bearing face 11, and in order to assist the introduction of the sheet 27, a stop 28 is provided, which is also referred to as an insertion stop. This insertion stop 28 engages with an area of the end sheet 15 that is disposed at a predetermined distance C from the insertion slot 16 which is small in relation to the distance D between the sheet edge portion 14 at the insertion slot side and the sheet edge portion 15a lying opposite thereto. In more general terms, the distance D is equal to the dimension of the sheets of the sheet pile 1 in the direction of movement in which these sheets have to be moved when they are removed from the pile or introduced into the pile.

The stop 28 is so arranged that the projection 29 (see FIG. 2c), parallel to the sheet faces and arranged on the stop face 28a of the insertion stop 28, lies within the extended portion 24 at the insertion slot side of the sheet edge bearing face 11. This ensures that the sheet edge portion 14 of the uppermost end sheet 15 cannot, in any position of the housing 2, enter into the insertion slot 16, and even not as a result of pressure acting on the pile 1 from below, for example by the drive roller 4.

The sheet edge bearing face 11 includes at least in the region of the extended portion 24 at the insertion slot side an acute angle $\beta$ with the face, facing outward from the pile, of the end sheet 15, which in the present case is equal to the angle $\alpha$ because, as already mentioned, the sheet edge bearing face 11, including its extended portions, is a continuous plane face. In principle, however, the angle $\beta$ need not be the same as angle $\alpha$.

The acute angle $\alpha$ or $\beta$ is generally between 30° and 60°, preferably between 45° and 60°, especially preferably between 40° and 50°. In an embodiment of the device according to the invention that operates extremely well, the size of the acute angles $\alpha$ and $\beta$ was 42°.

On the side of the pile 1 remote from the edge bearing face 11 a counter sheet edge bearing face 30 is provided, which forms an acute angle $\gamma$ with the face, facing towards the inside of the pile, of the upper end sheet 15 and which is disposed at a distance from the sheet edge bearing face 11 that is slightly larger than the longitudinal dimension of the sheets in the direction of displacement. This counter sheet edge bearing face 30 is, as already expressed by its name, the counter face for the sheet edge bearing face 11. As a result these two faces 11 and 30 are preferably made complementary to one another so that the counter sheet edge bearing face 30 in the embodiment of FIG. 1 is likewise plane and the acute angle $\gamma$ is equal to the angle $\alpha$ and the angle $\beta$.

The principle generally underlying the invention, that is, the separation of one sheet from a pile of sheets and the principle of introducing a sheet into a pile of sheets, will now be explained in detail with reference to the FIGS. 2a-2c in the light of the operation of the embodiment of a photo-viewing change device shown in FIG. 1.

First of all reference is made to FIGS. 2a and 2b; FIG. 2a shows the lower end sheet 13 in its rest state, that is in the position it normally holds in the pile before it is acted upon by a displacing force in the direction of the removal slot 10. In this position its sheet edge portion 12 adjacent to the removal slot is in front of the extended portion 18 of the sheet edge bearing face 11. In this position it is held by the stop 20. If the drive roller 4 consisting, for example, of rubber, is pressed in the region of the aperture 7 onto the lower face of the end sheet 13 and simultaneously turned in the direction of the arrow 31, a displacing force in the direction of the arrow 32 acts on the sheet 13, so that the sheet edge portion 12 is pressed against the extended portion 18 of the sheet edge bearing face 11. Since the sheet 13, on account of the overlying sheets of the sheet pile 1, of which only the next two sheets 33 and 34 are shown, cannot bend upwards in the region of the sheet edge portion 12, it bends into the separating space 19 and, because it is pressed towards the right in the direction of the arrow 32 in FIG. 2a by the displacing force, it finally reaches the removal slot 10, from which it emerges on further operation of the drive roller 4 in the above-mentioned manner.

The automatic bending of the sheet edge portion 12 into the separating space 19 and its movement into the removal slot 10 is further assisted by the inclination of the sheet edge bearing face 11 (see the angle $\alpha$), which to a certain extent acts as a "guide face" introducing the sheet edge portion 12 in the sense of a movement into the separating space 19 and the removal slot 10. It may be mentioned at this point that the inclination of the sheet edge bearing face 11 in the direction of the sheet pile is exactly reversed, so that the sheet edge portion 12 is prevented from being deflected towards the inside of the pile, that is upwards, not only by the overlying sheets but also by the inclination of the sheet edge bearing face 11.

It must be noted that the frictional force which, when the lower end sheet 13 is moved, acts between the latter and the sheet 33 lying directly above and which likewise results in a displacement of the sheet in the direction of the sheet edge bearing face 11, is smaller than the frictional and deflection force that would have to be applied to the front edge portion 35 of the sheet 33 in order also to deflect this into the separating space 19 and into the removal slot 10; hence the movement of two sheets at the same time to the inner inlet of the removal slot is prevented. As a result the distance A between the sheet edge bearing face of the sheet edge portion 12 adjacent thereto and the front edge portion, in the direction of withdrawl of the sheet to be removed, of the removal stop is - physically expressed - so selected that the frictional force transmitted between the sheet 13 to be removed and the sheet 33 adjacent thereto, is small in comparison with the frictional force necessary to bend the sheet edge portions at the separating face 11.

The afore-mentioned force ratios are chiefly assured by so selecting the angle of inclination of the sheet edge bearing face 11, that is the acute angle $\alpha$, that it lies within the above-mentioned ranges. They are also assured as a result of the fact that the coefficient of friction between the surfaces of the drive roller 4 and the underside of the sheet 13, by appropriate selection of the material of the surface of the drive roller 4, is substantially greater than the coefficient of friction between the adjacent faces of the sheets 13 and 33.

Since these force ratios are effective irrespective of whether the sheet 33, which is adjacent to the sheet 13 to be removed, is slightly shorter, of the same length or slightly longer than the sheet 13 to be removed, it is of no importance whether, as a result of the frictional forces between the two sheets, the edge portion 35 of the sheet 33 adjacent thereto strikes the sheet edge bearing face 11 at the same time as the sheet edge portion 12 at the beginning of the displacement movement or whether the sheet edge portion 35 strikes the sheet edge bearing face 11 earlier or later than the sheet edge portion 12. For the force transmitted to the sheet 33 as a result of friction is not sufficient, on account of the above ratios, to deflect the sheet edge portion 35 downwards. Obviously the most advantageous case is where the sheet edge portion 12 strikes the sheet edge bearing face 11 earlier, since it then pushes the sheet 33 upwards in the region of the transition of the stop face 20 into the separating space 19, that is in the region of the bend 13a (see FIG. 2b) which results when the sheet edge portion 12 enters into the separating space 19. Slightly less favourable is the case in which both sheet edge portions 12 and 35 simultaneously strike the sheet edge bearing face 11, since at that point the bend 13a has not been formed. In this case, however, the sheet edge portion 12 acts to a certain extent as a "stop" against the sheet edge portion 35 bending into the separating space 19. The same effect occurs, although to a lesser extent, even when the sheet edge portion 35 strikes the sheet edge bearing face 11 before the sheet edge portion 12.

The reintroduction of a sheet 27 (see FIG. 2c) into the pile 1 will now be explained in detail.

In order that the sheet may be pushed onto the upper side of the pile without being hindered by the edge portion 14 of the uppermost sheet 15 of the pile, the already-mentioned insertion space 25 is provided, which is created by the insertion stop 28 in conjunction with the extended portion 24 of the sheet edge bearing face 11, since the insertion stop 28 pushes and holds down the sheet 15 that is adjacent to it before the insertion of the sheet 27 (see FIG. 2a), so that the sheet edge portion 14 of this sheet comes to rest noticeably below the insertion slot 16. By means of the inclined face 36, which is provided on the side of the stop 28 that lies opposite the insertion slot, the front edge portion 26 of the sheet 27, when it has entered into the insertion slot 16, is pushed downwards, that is towards the pile, and the front edge portion 26 can, without meeting any noticeable resistance, slide along the upper side of the sheet 15 in FIG. 2c towards the left until it reaches the vicinity of the counter sheet edge bearing face 30 and the sheet 27 is fully inserted into the pile.

At this point, attention is drawn in particular to the fact that as a result of the inclination of the extended portion 24 (see the angle $\beta$) hindrance of the insertion of the sheet 27 by the edge portion 14 is also prevented when the edge portion 26 of the sheet 27 engages, in the vicinity of the stop face 36, with the sheet 15, and pushes this, for example as a result of the dimensional tolerances, slightly in the direction of the counter sheet edge bearing face 30. For the angle $\beta$ is so selected in conjunction with the length of the extended portion 24 that the sheet edge portion 14, even when the sheet 15 is the shortest possible within the scope of the dimensional tolerances, cannot be "moved up or bent up" until it is in the region of the insertion slot.

Finally, it must be commented in connection with the insertion space that it permits the insertion of a sheet 27 no matter what position the housing is in or how many sheets it contains. This reinsertion is, in the simple embodiment of FIG. 1, carried out by hand, since this embodiment was created with the aim of supplying as simple as possible a device that can operate without special mechanisms The removal slot 10 may be curved or slightly upwardly inclined, that is, form an acute angle $\delta$ with the extended portion 37 of the side, facing the pile of sheets, of the end sheets 13 disposed in the rest position. This acute angle $\delta$ is preferably between 1° and 10°, especially between 2° and 4°.

The loop 5, which is recessed in the housing base 8, may act as an inclined standing element for standing the housing 2 on a table, for which purpose it can be pivoted right out of the housing base and in fact at least so far that it forms an acute and/or right angle with the base of the housing. The loop may furthermore be locked in these two positions. In this manner it is possible to use the housing 2 as it were as a stand-up picture frame, either in the horizontal or in the upright position. It is thus possible, as desired, at certain intervals of days, weeks or months, to keep putting another picture from the pile 1 as uppermost sheet of the pile 1 under the essentially transparent housing lid.

It must also be mentioned that the drive roller 4 is not arranged too close to the removal slot since it would otherwise hinder the edge portion 12 bending into the separating space 19; however, it is also not too far away from the removal slot since it would otherwise act with such a pressure on the sheet 33 lying on the lower sheet 13, that instead of the front edge portion 35 being pushed upwards it would rather be pushed downwards. Therefore, the pressure roller 4, since it can also be adapted to the number of sheets in the housing, simultaneously solves three problems, as can be seen from the above comments.

It must also be mentioned that the drive or transport roller 4 in the embodiment according to FIG. 1a and 1b may also be arranged at the opposite boundary of the housing 2 in a corresponding aperture and may be movable by finger pressure with its axle in the direction of the pile 1, so that it can be operated by hand, whilst with the other hand the sheet, in question is removed from the housing 2 so that there is a natural division of work between the two hands of the user.

FIG. 1c is a plan view of the housing base 8 of an embodiment which is modified in comparison with the FIGS. 1a and 1b, the roller 4 being arranged in an aperture 7 that is broader than the length of the drive roller 4 and extends from the middle of the housing in the direction of the removal slot as far as the region of the boundary of the housing base 8 disposed in its vicinity.

The drive roller 4 in FIG. 1c is attached to a loop 5, which is displaceable in the direction of displacement of the sheets of the pile 1 along the housing base and is guided by its ends 5a in an aperture 7a each in the housing base, which aperture must be covered at the outside of the husing base so that the loop ends 5a cannot leave the plane of the housing base 8. The loop 5 is held in the rest position shown in FIG. 1c by a return spring 5b. The transport roller attached to the other end of the loop is a free-running roller and is locked so that it cannot rotate when it is pushed by the user's hand in the direction of arrow 5c against the rear side of the adjacent sheet and is pulled in the direction of the arrow 5c, so that it acts as a transporter member and pushes the sheet through the removal sheet 10, especially since it is made of such a material that a relatively large coefficient of friction is produced between the underside of the sheet and the transport roller 4 (for example is consists of rubber or plastics material). When the sheet has emerged from the removal slot it can be taken hold of by the user and pulled out completely once he has released the transport roller 4, which is rotatable in the opposite direction to arrow 5c and owing to the recovery force of the return spring 5b is pulled back into the rest position shown in FIG. 1c, in which it can roll on the underside of the now undermost sheet of the pile 1. The advantage of the embodiment according to FIG. 1c in comparison with that according to FIGS. 1a and 1b consists in that the direction of movement of the user's finger agrees with the direction of movement of the particular sheet to be removed.

For manufacturing reasons it is advantageous for the loop 5 in the embodiments according to FIGS. 1a to c to be curved before the transport roll or roller 4 is arranged thereon. This is normally not possible, but can be achieved with a roller, illustrated in FIG. 1d in cross-section, which has a slot 4d extending tangentially away from its axial aperture 4a in the direction of rotation 4b in the shape of a curve as far as the peripheral face 4c, which slot, since the material of the transport roll or roller 4 is preferably resilient, in this case may be of a smaller thickness than the loop 5 consisting of wire or plastics material.

FIG. 1e shows a possible modification of the transport means according to FIG. 1c, in which instead of the loop 5 a plate 5f is provided, on which a retentive element 4e consisting, for example, of rubber, and in the form of a small platelet is disposed, which replaces the transport roller 4. The plate 5f is displaceably mounted in the housing base 8, and in such a manner that the retentive element 4e engages on the respective lower sheet of the sheet pile, that is the sheet 13 in the FIGS. 2a to 2c. On the lower side of the plate 5f in FIG. 1e, a fluted area or an edge that can be engaged by the user's finger, may be provided, so that the user need only move the plate in the push-out direction of the sheet and can then release it after taking hold of the sheet.

FIG. 1f shows a cover 5g, which as a step 5h, on which a user's finger F can engage, and this cover is either attached to the loop 5 or is provided instead of the loop 5, wherein in the latter case the transport roller 4 is also mounted on the cover 5g and the cover itself is displaceably mounted in the housing base 8.

FIG. 3a shows a modified embodiment of the device according to FIG. 2, in which a slider member 39 is provided, which can be almost completely removed (apart from a short section) from the housing 40, which otherwise is constructed in the same manner as the housing 2 and which has a leaf spring 41 at each side, which press the emerging sheet upwards against the bearing faces of the slider member. The advantage of this embodiment consists in that on reinsertion of the removed sheet it is not necessary to "aim", so that the reintroduction position of this sheet is assured and is effected semi-automatically.

FIGS. 3b and 3c show a possible modification, which makes the springs 41 superfluous. In this case, at the end of the slider member that in the direction of withdrawal of the slider member is at the rear, a cam-like elevation 39a is provided in the base of the slider member, approximately at 39b in FIG. 3a, and the part against which the sheet edge bearing face 11 is disposed and which is here indicated by 39c and is, for example, of triangular cross-section but may also be of some other cross-section, is rotatable about an axis 39c in the direction of the arrow 39e, against the resilient force of a spring, for example, a torsion spring.

When the cam-like elevations 39a strike against the, in FIG. 3b, lower edge portion of the rotating wedge 39c on reinsertion, they turn the wedge in the direction of the arrow 39e, the sheet 39f to be introduced being guided upwards along the face of the rotating wedge facing it (see FIG. 3c) and being pushed into the insertion slot 16 (not shown here) on pushing the slider member 39 further into the housing. As can be seen, in this modification what can be regarded as "points", are provided, these points consisting of the rotating wedge 39d and the cam-like elevation 39a.

In FIGS. 4a to 4f a further embodiment of the invention is illustrated, by means of which fully automatic removal of the sheets from the pile, and reinsertion of the sheets into the pile is possible merely by withdrawing a slider member 43 out of the housing 42 and resinserting it into the housing.

The slider member 43 is movable perpendicular to the removal slot 10, provided at the top in this embodiment, to such an extent that it completely accommodates on the transport faces 45 provided therefor, the particular sheet 44 emerging from the slot, by means of which faces the sheet is reinserted into the insertion slot 16. However, complete removal of the slider member from the housing is prevented by appropriate stops.

For its back and forth movement, the slider member 43 is guided in the housing 42, for which purpose it has a frame 46 (see FIG. 4b and f), which has slider member parts 47 extending in the direction of movement of the slider member, which parts are slidably displaceable in corresponding recesses 48 in the inside of the housing 42 and/or in the housing base. The slider member can be guided in the housing in a wide variety of ways and may also be designed in any of a large number of manners, for example, it may be extractable in the manner of a telescope.

Preferably, the slider member 43 is partially guided at the side walls of the housing 42, so that the faces of the guide parts of the slider member that face the inside of the slider member comprise bearing faces, by means of which the sheet drawn out on the housing is prevented from falling out of the slider member at the side.

Figure 4F:
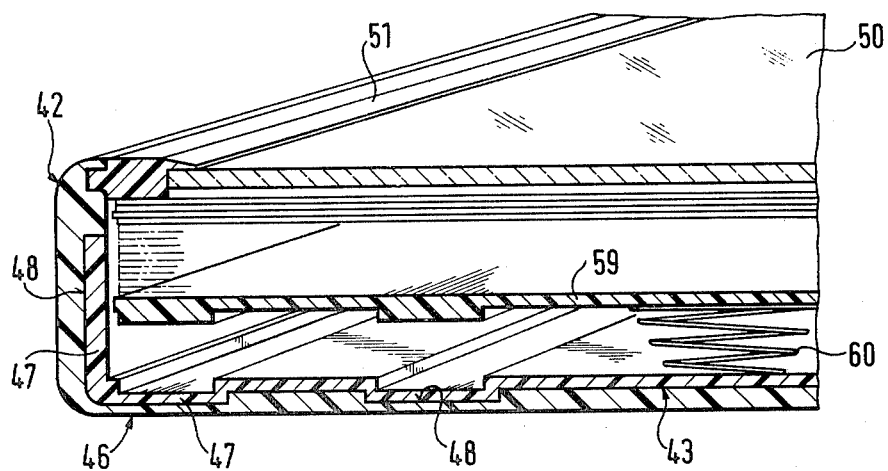
FIG. 4f is a partial view of the device shown in FIG. 4a but on a larger scale and partially in section.

In the embodiment shown in FIG. 4a to 4g, the slider member furthermore comprises the essentially transparent housing lid 49, which may consist of a transparent plate 50 secured in a frame 51 (see FIG. 4f). So that the sheets cannot fall out when the slider member is fully drawn out, in which position they practically lie freely, the slider member can be drawn out of the housing 42 only to such an extent that the rear edge portion 51 of the slider member, in the direction of withdrawal, still covers the corresponding edge portion of the pile 1. At the other end of the housing tongue-shaped members 52 are provided, which are called hold-down tongues since they engage over the edge portion of the uppermost sheet and "hold it down" in each case by means of a picture bearing face, that is to say hold it back from springing or falling out of the housing 42 when the slider member 43 is drawn out.

The operating end of the slider member 43 is extended at the bottom in the direction of the housing 42 by a flange 53. When the slider member 43 is inserted, this flange projects by a suitable length, for example, 10 to 14 mm, into the base of the housing, which at this area has a corresponding recess 54. The purpose of the flange 53 is to act as gripping face.

The principle of the removal of a sheet and its reintroduction is the same as already described with reference to FIG. 2a to 2c, wherein the sheet edge bearing face 11 is disposed on a component 55 fixed to the housing 42, which component is also referred to as a separating wedge or separator and limits a side each of the removal slot 10 and of the insertion slot 16. The other side of the removal slot 10 is formed by the inner side of the slider member lid 49 and the other side of the insertion slot 16 is formed, completely or partially, by the slider member parts 47, which extend in the direction of movement of the slider member. The separating stop is formed by a spring 56 provided at each side of the slider member (of which only one is visible in FIG. 4a), more precisely by its front outward bend 57 in the direction of withdrawal of the slider member. These springs, which are also caled hold-down springs, furthermore have the purpose of transferring the sheet 44 emerging from the removal slot 10 to the transport faces 45 provided on the slider member, by means of which transport faces the sheet is inserted into the insertion slot 16, the insertion stop 58 of which is formed by one or more resilient tongues which are provided on a pressure plate 59. The pressure plate is under the pressure of a spring 60 and this pushes the sheet pile 1 against the inner side of the slider member lid 49.

Pushing out the sheet through the removal slot 10 is effected by means of a grab member 61, which is provided at the rear end of the slider member lid 49 and is essentially in the shape of a projection adjacent to which in the direction of withdrawal of the slider member is a grab cavity, which has the purpose of enabling the edge portion of the sheet that is to be removed to snap reliably into engagement with the grab member under the action of the pressure plate 59. The cavity 62 may be, for example, a recess approximately 3 mm wide and 0.5 mm deep. In this manner the grab edge is extended to a certain extent on the "harmless" side, that is upwards, where the second uppermost picture cannot be touched.

This is particularly of advantage when the edge portion of the sheet engaging with the grab member is compressed in the sense that it is damaged, that is to say it has been widened. By this means further damage to the sheet is prevented.

The more reliable operation of this system is based on the generally presented fact that the pictures preferably used as sheets have at the boundary of their edges at the picture side an acute angle of cut and at the opposite-lying boundary an obtuse angle.

The rotating wedge 63 is rotatable about the axis 64, so that the hold-down tongues 52 disposed on it release completely the sheet pile 1 in the region of the left-hand margin in FIG. 4a when the rotating wedge is rotated out of its rest position. In this manner it is possible to remove the sheet pile 1 from the housing 42 when the slider member 43 is drawn out. In particular it is possible to fill the housing 42 with a sheet pile 1 simply and automatically. A locking means is provided in order to ensure that the rotating wedge is reliably held in its normal position, shown in FIG. 4a. This locking means is formed essentially by a plane face 66 disposed on the inner side of the housing base and by a counter plane face 67 disposed on the opposite-lying side of the rotating wedge 63, wherein the plane face 66 and the counter plane face 67 are resiliently adjacent to each other, which may be achieved, for example, by the inherent resilience of the housing base which is formed in an appropriate manner. The counter plane face 67, beyond the outer side of the housing, becomes a curved face 68, the radius of curvature r of which increases to a radius of $r + \Delta r$, r being equal to the distance of the rotating axle 64 from the plane face 66. On the other side of the rotating wedge there adjoins the plane face 67 a lug 65, which engages under the adjacent edge portion of the sheet pile 1 and when the rotating wedge 63 is pivoted out of its normal position lifts up the sheet pile at the edge so that it can be removed more easily.

The rotating wedge is provided at the upper end with two step-like shoulders 100 and 99, the height of which in each case is approximately equal to the sheet thickness. These step-like shoulders effect a pre-sorting operation in the sense that the grab member 61 can in practice take hold only of the edge of the uppermost sheet, for the following reasons:

When the slider member 43 is pushed back again after the removal of a sheet, in order to push this removed sheet back in at the bottom through the insertion slot 10, the inner side of the housing lid 49, which is attached to the slider member 43, exerts a frictional force on the uppermost sheet of the pile, which is partially transmitted to the underlying sheets. The result of this frictional force is that the uppermost sheet, which during removal of the previous sheet has been taken along towards the sheet edge bearing face 11 by means of friction of the latter sheet, is now pushed back again. Since it is pressed upwards by the pressure plate 59, it can only be pushed back as far as the first step-like shoulder, because it is prevented by this from any further movement in the direction of the counter sheet edge bearing face 30. Conversely, the second-uppermost sheet is pushed back further as far as the second step-like shoulder 99 because, in as much as it comes into contact at all with the lower edge of the step-like shoulder 100 in FIG. 4a and 4c, it can slide over this edge since the edge is inclined or rounded.

This presorting also operates when there are corresponding dimensional tolerances to which the sheets are subject and on account of which circumstances may arise where the uppermost sheet is shorter or longer than the second uppermost sheet or is the same length as the latter. This will be explained in detail.

(a) When the uppermost sheet is shorter than the second uppermost sheet, the first step-like shoulder 100 may come into contact with the edge of the second uppermost sheet before the uppermost sheet has reached it. Since, however, the movement transmitted as a result of the frictional force between the slider member lid 49 and the uppermost sheet is substantially greater than that between the uppermost and the second uppermost sheet, the latter is ultimately dislodged by the uppermost sheet and pushed over the rounded edge of the first step-like shoulder 100 further back to the second step-like shoulder 99. (b) When the uppermost and the second uppermost sheet are of the same length, when the slider member is pulled out during the withdrawal of the preceding sheet, the, in FIG. 4a, rearmost edge of the uppermost sheet, at the beginning of reinsertion of the slider member, lies further to the right with respect to the corresponding edge of the second uppermost sheet, so that the edge of the second uppermost sheet comes into contact first with the first step-like shoulder 100 and is then displaced by the uppermost sheet and pushed back to the second step-like shoulder 99. (c) When, finally, the uppermost sheet is longer than the second uppermost, then its sheet edge portion engages with the first step-like shoulder first, whereas the corresponding edge portion of the second uppermost sheet comes to rest further to the right. In this case too the sheet edge portion of the uppermost sheet to be engaged by the grab member is reliably separated from the edge portion of the second uppermost sheet.

The satisfactory operation of the grab edge 61 and the step-like shoulders 100 and 99 providing a pre-separating operation, is ensured as a result of the fact that the hold-down tongues 52, on which the two step-like shoulders are provided, are doubly secured at exactly the right level, that is to say, on the one hand by the above-mentioned locking means, by means of which the rotating wedge is reliably held in its normal position, and on the other hand as a result of the fact that the hold-down tongues 52 are likewise held at exactly the right level by means of recesses 84 in the slider member lid 49, so that as a result trouble-free operation of the step-like shoulders and the grab edge is ensured.

The conical spiral spring 60 is so designed or arranged that it exerts a stronger pressure on the left-hand part (in FIG. 4a) of the pressure plate 59 than on the right-hand part. This is achieved by the fact that first, the respective sheet edge portion is reliably pressed into the grab cavity 62 at the rear edge of the slider member and secondary hindrance of the front bends 57 of the hold-down springs 56 assisting separation is avoided.

It must also be mentioned that the pressure plate 59 and the resilient insertion stop 58 may comprise a single part of resilient metal or plastics material, which may in addition have punched-out tongues on the inside taking over the function of the springs 60. The resilient insertion stop 58 should be as broad as possible so that it is not possible even for bent sheets to stick when reinserted. Furthermore, the resilience of the insertion stop is such that even when there are no or only a few sheets in the housing 42 it extends as far as or almost as far as the base of the housing, so that when there are few sheets in the housing, a sheet to be inserted is not pushed under the pressure plate.

Figure 4G:
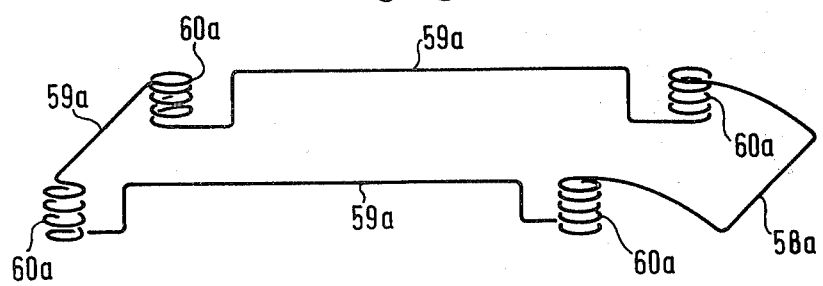
FIG. 4g is a perspective view of a pressure element made of wire, by which the pressure plate including the conical spiral spring and the insertion stop of the device according to FIG. 4a can be replaced.

The pressure plate 59 may also be formed by a "wire frame" produced from resilient steel or resilient round plastics material, as shown in one embodiment, for example in FIG. 4g. A member of this type may be curved from a single length of wire, and it may be so curved that in each corner of an imaginary quadrangle there is a spiral spring 60a, which replaces the spiral spring 60 and may likewise be conically shaped. These spiral springs 60a are joined to each other by intermediate bars 59a, which are extensions of the spiral springs, and these intermediate bars are disposed on the upper level of the ends of the spiral springs 60a, so that they, as it were, form the bearing faces for the sheet pile 1, which in FIG. 4a are formed by the pressure plate 59. The two front spiral springs 60a in FIG. 4g are joined to each other by an intermediate bar 58a, which is likewise an extension of the spiral springs and extends downwards at an inclination from the upper side of the spiral springs, so that it has the function of the insertion stop 58 and simultaneously, as a result of its upwardly inclined face, guides or directs the sheet coming into the insertion slot 16 upward and in fact is so designed that the front end of the insertion stop 58, which is not shown in FIG. 4a, also extends as far as the housing base and ascends at an angle towards the inside of the housing.

FIG. 4d shows a section through the grab-side end of the lid 49 attached to the slider member 43, in which lid there is provided in the grab cavity 62 a strip 62a of a material having a relatively high coefficient of friction, for example, rubber, the free surface 62b of which, which is preferably flat, is displaced with respect to the lower edge 49b of the grab member towards the inside of the cavity 62 by the height h, which is preferably 0.1 mm.

Instead of the strip 62a, a magnetic rod or strip may be provided, if there are attached to the sheets of the pile 1, at the grab-side boundary of each sheet, one or more flat elements, for examle, strips, of iron or another magnetically attractable material, which are disposed, for example, on the underside of the sheets. In this case the magnetic force is such that it can take along only the uppermost sheet. Even when the next sheet is also taken along to a certain extent by the magnetic force which, however, is substantially weaker, this sheet is held back by the separating wedge 55.

Finally, FIG. 4e shows a cross-section through the housing lid 49, in which the springs 56 are replaced by a resilient and transparent plate 56a, which in the unloaded state has a bend 56b, which corresponds to the insertion stop 58. For manufacturing reasons this is of great advantage, because in this case the housing lid 49 and the resilient plate 56a can both be injection-molded from transparent plastics material, and preferably from the same material in one operating step.

The plate 56 has at 56b (in the same manner as the spring 56 in the region 57) a relatively flat, outwardly curved region 56c, so that the sheet concerned is subject to pressure on a relatively large area of its length. To this end the plate is relatively strongly curved at 56d and also at 56e.

Figure 5A:
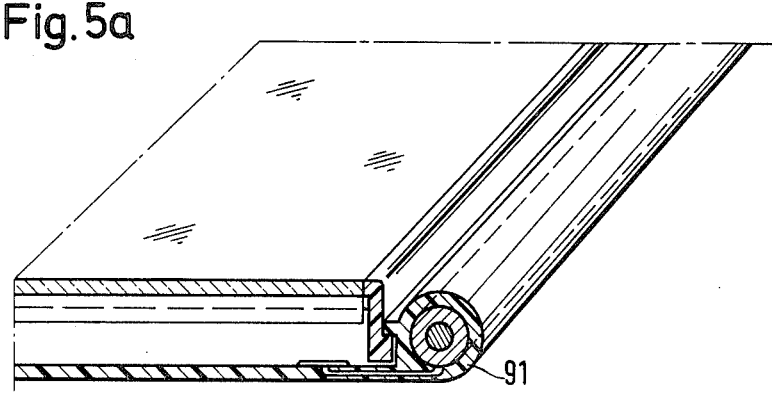
FIGS. 5a and 5b are partially schematic views of a fourth embodiment of the invention in which the separation of the particular sheet to be removed is effected by suction means, FIG. 5a showing a perspective view partially in cross-section and FIG. 5b showing a schematic longitudinal section.
Figure 5B:
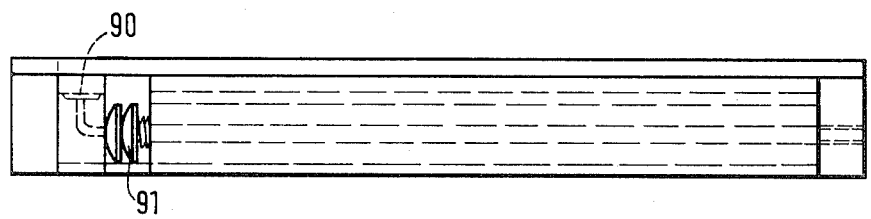

Furthermore FIG. 5a and 5b show a device in which the separation and removal of the sheet to be removed is effected by a suction means 90, which is connected to a vacuum pump 91. This vacuum pump is operated and controlled by a slider member.

A particular preferred embodiment of a device in which the uppermost sheet of a pile is transported by a suction means, is shown in longitudinal section in FIG. 6. This device comprises, similarly to the device in FIG. 4a, a housing 42, which has a slider member 43. This slider member consists of two parts, that is, a first part 43a, which forms the main part of the slider member, and a second front part 43b, which is arranged at the front of the slider member in the direction of withdrawal of the slider member. This part 43b is displaceably mounted by the distance E in the withdrawal and insertion direction of the slider member 43, which is indicated by the double arrow 70. To withdraw and insert the slider member 43, the user grips the gripping faces, which are provided on the slider member part 43b. As a result, if starting in the position shown in FIG. 6, the slider member 43b, on later reinsertion of the slider member 43 into the housing, is first moved with its stop face 71 as far as the stop face 72 before the slider member part 43a together with the slider member part 43b is pushed into the housing. On removal the reverse happens, that is to say, the slider member part 43b is moved first, whereas the slider member part 43a is held in the housing by the frictional resistance to which it is exposed by the housing during the displacement movement. The slider member part 43b is moved so far until the stop 71 is removed from the stop 72 by the distance E, and then the slider member part 43b can move no further from the slider member part 43a, so that it takes the latter with it.

The reason for the relative movement of the slider member parts 43a and 43b being limited to the distance E is as follows:

The slider member part 43b is attached by a rod 73 to a piston 74 moved in a cylinder 75, which is provided at the rear end, in the direction of withdrawal of the slider member 43, of the slider member part 43a its axis extending parallel to the direction of withdrawal and insertion of the slider member 43. When the slider member 43 is completely in the housing, the piston 74 assumes its furthest left position, shown in FIG. 6, in which its front edge 76 is disposed in the position indicated by the broken line 77. When the user pulls the slider member part 43b, first of all the piston 74 moves so far out of this position to the right until its movement is terminated by the end of the cylinder bore 75, and then the slider member 43a is necessarily taken along.

This movement of the piston 74 results in a reduced pressure in the cylinder 75, by means of which the uppermost sheet 15 is sucked against a suction aperture 78 provided in the cylinder 75, around the circumference of which aperture a seal 79 is provided. This seal, which may be, for example, an O-ring made of rubber, is so arranged that its side facing the sheet pile 1 is flush with the underside of the slider member lid 49, so that the frictional forces that are exerted on the uppermost sheet on reinsertion of the slider member 43 into the housing 42 are as low as possible. If desired, a broad, shallow recess 80, which is indicated in broken lines, is provided around the suction aperture 78 and the seal 79, whereby it is possible to arrange the seal 79 even slightly recessed in the slider member lid 49, because then the corresponding upper side of the sheet 15 can move into this recess.

As already mentioned above, the frictional resistances are such that the relative movement between the slider member parts 43a and 43b experience a lower frictional resistance than the withdrawal and insertion movement of the slider member 43, a condition that is a prerequisite for satisfactory operation. Furthermore, the device in FIG. 6 may be of substantially the same design as that according to FIG. 4b, so that it is not necessary to explain further details, such as, for example, with respect to the pressure plate 59 and the spring 60, the latter of which is in this case formed by the two resilient ends of the pressure plate.

With reference to FIGS. 7a to 7e a device for the complete removal of the pile of sheets will now be explained in detail: in these Figures, in each case only that slider member is shown which could also be called a drawer, and is so-called further below, and which in the manner of notation used further above and in the patent claims is the "additional" slider member, that is the slider member that is actuated only in order to remove a pile of sheets from the housing (only partially shown). A slider member for changing the layer arrangement of the sheets in the housing, however, may be provided on the left-hand side (not shown) of the housing, which side may be of the same design, for example, as the right-hand side in FIGS. 4a and 4b with the slider member 43b for rearranging the sheets; the sides of the FIGS. 7a to 7e are therefore reversed in comparison with the latter FIGS. Such an additional slider member is provided in the devices according to FIGS. 4a and 4b, in which case the wedge 63 obviously need not be rotatable.

The view shown in FIG. 7a of a section along the line I—I of FIG. 7b shows a portion of a housing 101. FIG. 7a in fact shows a portion of one of the two side walls 102, 103 of the housing 101, and in this figure only a few special parts of the housing base 104, which are discussed in detail further below, are shown.

There maybe accommodated in the housing 101 a pile of sheets (not shown), which is placed on the base 104 of the housing 101 so that the sheet faces extend parallel to the base and the sheet pile is laterally surrounded by the side walls 102, 103 and another side wall 105 as well as a further side wall, not visible, which lies opposite the latter. There are provided on the side wall 105 holding fingers 106 which engage over the pile of sheets. On the side lying opposite the side wall 105 projections are provided on the housing 101 and/or on a slider member which serves to rearrange the sheets of the sheet pile, which projections engage over the sheet pile by a predetermined length when the latter slider member is drawn as far as possible out of the housing to rearrange the sheets. As a result, the sheet pile cannot easily be removed from the housing from above, and it is also not easily possible to insert a pile of sheets from above into the empty housing.

To make this possible, the side wall 105 of the housing 101 is attached to a slider member which is held by a locking means to the housing 101.

The locking means comprises a retaining catch 108 provided on the slider member 107, which retaining catch, in the locked state of the slider member 107, engages in a notch stop 109 provided on the housing 101, or more accurately speaking in the housing base 104, so that the slider member 107 cannot, in this state, be moved to the right (referring to FIGS. 7a and 7e) out of the housing 101.

The retaining catch 108 is attached to a tongue 110 and may be discharged from the notch stop 109 by pivoting the tongue in the direction of the arrow 11, that is towards the inside of the housing 101. So that the engagement between the retaining catch 108 and the notch stop 109 does not come loose accidentally, the tongue 110 is so provided or arranged on the slider member 107 that it holds the retaining catch 108 in engagement with the notch stop 109 by means of its inherent resilience, provided a pressure in the direction of arrow 111 is not exerted from below on the tongue 110.

When the tongue is pivoted upwards in the direction of the arrow 111, the upper side of the tongue engages with the sheet pile, not shown, and so that, on withdrawal of the slider member 107 of the tongue can transport the pile of sheets to the right, an engagement face 112 of high friction is provided on the tongue and in the present embodiment is, for example, a friction element 113, for example a rubber platelet, applied to the upper side of the tongue.

For the above-mentioned reasons of making it easy to feel the tongue 110 and avoiding unintentional operation of the same, a finger engagement recess 114 (see in particular FIG. 7c) is provided on the underside of the tongue. The finger engagement recess 114 is, in the present embodiment, disposed only a slight distance from a gripping face 115, which is preferably knurled and is used to hold the housing 101 at times when the slider member is not actually being pulled out of the housing. For the purpose of quick change-over of the holding finger from the gripping face 115 to the finger engagement recess 114, the latter may be arranged directly adjacent to the gripping face 115.

In the embodiment shown, the slider member 107 comprises a tongue-shaped guide member 116, which, as can be seen in FIG. 7b and 7e, extends into the region of the gripping face and is fixed there to the remaining part of the slider member 107 or is integral with this part. The tongue 110 is thus disposed in an elongate recess 117 in the guide member 116, and the latter is displaceable in the base 104 of the housing in the direction of movement of the slider member 107, its side edges being mounted in guide faces 118 in the housing base 104. These guide faces 118 may be, for example, in the form of a dovetail guide, which may for the rest be so arranged and designed that the guide member 116 cannot at its lateral margins 119 disengage from the guide faces 118 either on the inside of the housing or towards the outside.

There is provided on the guide member 116 a stop 120 which, for example, may be designed in the same manner as the retaining catch 108 but which may be of any other shape too, and cooperates with a counter stop 121 on or in the base 104 of the housing. As a result the movement of the slider member 107 out of the housing 101, that is in the directin of the arrow 122 (see FIG. 7a), is limited, and in fact to a slightly longer length than the above-mentioned predetermined length by which the sheet pile is overlapped on the side of the housing 101 lying opposite the slider member 107. If, consequently, adequate pressure is exerted on the tongue 110 in the direction of the arrow 111, the sheet pile is taken along by means of the friction element 113 of the slider member 107 when this is moved out, and at the left-hand side of the housing 101, which is not shown in FIG. 7a to 7e, is pulled forwards under the projections or other overlapping parts which are disposed there on the housing and/or on a slider member for rearranging the sheets of the pile. Since, on the other hand, the sheet pile is still held fast in the region of the opposite-lying side wall 105 by means of the holding finger 106, and thus, in spite of the pressure on the tongue 110 cannot be moved upwards, the latter pressure has the effect that only the left-hand side, in FIG. 7d, of the sheet pile is lifted, which, however, is completely adequate and is even advantageous because this prevents the sheet pile from being pressed out of the housing 101 in an uncontrolled manner as a result of too strong a pressure on the tongue 110, and from falling out onto the floor or falling apart into the individual sheets which have to be reassembled again.

After the sheet pile, which was previously in the housing 101, has been removed, the tongue 110 is released again and if desired another pile of sheets is placed in the housing, after which the slider member 107 is pushed back into the housing until the retaining catch 108, as a result of its inherent resilience, locks into the notch stop 109.

A slider member of the same or similar type to slider member 107, if desired, inclusive of the individual structural elements such as, for example, the stop 120, the counter stop 121, the elongate recess 117 etc., may also be provided in the case where a slider member is not used for the sheet change, such as, for example, in the case of FIGS. 1a–1c and 2a to 2c, as explained in detail in the following by way of the embodiments shown in FIGS. 8a–8f. In those cases in which the housing cannot be substantially opened above by a slider member provided for the sheet change, it is obviously necessary for the slider member used for total removal, which is called a drawer in the following, to have a larger withdrawal movement which is at least so large that the sheet pile can be removed effortlessly when the drawer is drawn to its outermost position.

The device shown in FIG. 8a to 8f is a modification of the embodiment according to FIG. 1b, so that only the essential differences are explained in the following.

Disposed in the housing 2 is a drawer 201, which, as shown in FIG. 8b, when necessary can be drawn so far out of the housing 2 that the sheet pile disposed therein, which is not shown in FIG. 8b–8d, can be completely removed. So that the pressure roller 4 functions in principle as before, as in the embodiment according to FIG. 1b, the underside of the drawer 201 is provided with a corresponding aperture 202 which is so large that the prop 202 rotatable about the axis 6, which prop corresponds to the loop 5 in FIG. 1b, or instead may also be such a loop, can move into the inside of the housing 1 in order to adapt to different thicknesses of pile, as indicated by broken lines in FIG. 8d. At the lateral free ends of the prop 202 projections 203 are provided, which on account of the design of the front lateral free ends of the prop 202 can resiliently deflect the adjacent edges 204 of the housing base by corresponding pressure on the prop 202. These projections serve to prevent the prop 202, after it has been pressed at its free end into the inside of the housing, from being able to move out of the housing again of its own accord. In this manner the prop 202 can lock in the housing, which is important, for example, for carrying in a pocket. This locking arrangement prevents a projecting prop 202 from catching on anything into which the housing 2 is to be placed, for example on a breast pocket.

There are provided on the front region, in the direction of withdrawal, of the drawer 201 opposite-lying lateral recesses 205, which are, for example, semicircular in plan view, by means of which it is possible to take hold of the sheet pile disposed in the drawer 201 directly by the thumb and index finger and to remove the pile from the drawer 201, the drawer being provided at its front end with lateral gripping faces 206 to facilitate removal from the housing 2.

A stop 210 disposed in the base of the drawer 201, which stop cooperates with a corresponding counter stop in the housing 2, locks the drawer 201 in its inserted position in the housing 2 and prevents its complete withdrawal.

Furthermore, the slider member has on its front end face, at each side, a groove for the insertion of a label 207, on which the contents may be entered. Finally, first stacking protuberances 208 are provided on the upper side of the housing 2 and second stacking protuberances are provided on the lower side of the housing 2, in such a manner that when several housings are placed one above the other the upper stacking protuberances 208 are engaged on practically all sides by the lower stacking protuberances 209, so that the drawer in a stacked housing can be drawn out sideways without having to remove this housing from the stack.

FIG. 9a to 9d show a device which is a modification of the embodiment shown in FIG. 4a, and in these Figures only the essential differences from the embodiment in FIG. 4a are shown:

Inside the slider member, which is pulled out of and pushed back in to the housing 42 again in the direction of arrow 211 in order to rearrange the pile, there is a drawer 212, which during this movement remains at rest relative to the slider member 43. In order to operate the sheet change of the device, lateral gripping faces 213 are provided at the front end of the slider member 43 and upper and lower gripping faces 214 are provided at the opposite end of the housing 42.

If the entire pile 1 is to be removed, the drawer 212 is pulled out of the housing 42 and of the slider member 43 in the direction of the arrow 215, the separating wedge 216, which is attached to the drawer 212, being moved out as well, whereas the pressure plate 59 and the springs 60 remain together with the slider member 43 in the housing 42. For this purpose the base of the drawer 212 has a corresponding recess 217, so that the drawer 212 is U-shaped in plan view, as can be seen clearly from FIG. 9b. To pull out the drawer 212 from the slider member 43, on the one hand the lateral gripping faces 218 are taken hold of, these being provided at the front end, in the direction of withdrawal, of the drawer, and on the other hand the gripping faces 213 of the slider member 43 are taken hold of.

In contradistinction to the embodiment according to FIG. 4a, the part 219, by means of which the uppermost sheet 15 is removed from the pile 1 by pushing out sideways, is attached not to the slider member 43 but to the housing 42, so that the uppermost sheet 15 is held fast in the housing by the part 219 whilst the rest of the pile 1 is moved out of the housing with the slider member 43.

In detail, the part 219 is mounted in a recess 220 in the lid of the housing so as to be pivotable through a small predetermined angle, the recess being of essentially the same shape as the part 219. The part 219 has at its right-hand end in the drawing a cylindrical face 221, which is adjacent to a corresponding cylindrical face 222 of the recess, so that the part 219 can be rotated by mutual displacement of these cylindrical faces around the cylindrical axis, as a result of which the opposite end of this part 219 can move up and down between two stops 224 and 225 provided in the recess 220. There is provided on the upper side of the part 219 a recess 226, in which a leaf spring 227 is disposed, which is supported at one end against the part 219 and at the other end against the upper wall of the recess 220, and pushes the part 219 downwards so that if no counter force were to act the end 223 would be pressed against the stop 225.

On its side facing the sheet pile 1, the part 219 is provided with a retentive element 228, which consists, for example, of rubber and is arranged in a recess 229 in the part 219. The retentive element projects slightly beyond the part 219, so that it engages reliably with the uppermost sheet 15 of the sheet pile 1. Behind the retentive element 228 in the direction of movement (see the arrow 230) of the sheet pile 1, a hook-like protuberance 231 is provided, which projects beyond the retentive element in the direction of the pile 1 by an amount that is slightly less than the thickness of one sheet of the pile 1.

The function of the fixed part 219, which may also be called a fixed transporter element, is as follows:

In the inserted position of the slider member 43, the front end 231', in the direction of withdrawal of the latter, of the sheet pile 1 is always beneath the retentive element 228, as can be seen in FIG. 9a and 9c. When the slider member 43 is drawn out of the housing in the direction of arrow 211, the retentive element 228 holds the uppermost sheet 15 fast as a result of its frictional engagement with the same. If, for some reason, this friction is not quite enough, the sheet 15 can move in relation to the part 219 only to the point where it engages with the hook-like protuberance 231, which then, however, cannot engage the next sheet of the pile 1. In any event the uppermost sheet 15 is securely held and in this manner is removed from the pile 1. The purpose of the leaf spring is, when sheets are slightly uneven, always to ensure reliable engagement of the retentive element 228 and the hook-like protuberance 231 on the one hand with the uppermost sheet 15 on the other hand. On reinsertion of the slider member 43 into the housing 42, the hook-like protuberance 231 ensures that the uppermost sheet does not contact the retentive element 228, therefore the sheet pile 1 can be moved past under the part 219 without much resistance.

Another form of a transporter element 233, which likewise has a hook-like protuberance 234 and a retentive element 235 consisting of, for example, rubber, is shown in FIG. 10a to 10c. The retentive element 235 and the hook-like protuberance 234 are arranged one after the other in the circumferential direction on the circumference of a roller 236, and this roller is pivotable about its axle 237, which extends parallel to the sheet pile 1. The rotary movement of the roller 236 about the axle 237 is controlled by a cam 238 fixed to the roller 236 and a cam control member 239, which in turn is fixed in position with respect to the roller 236. For example, the roller axle 237 instead of the grab member 61 can be fixed on the slider member 43 of the device according to FIG. 4a, in which case the cam control member 239 is provided on the housing 42.

The operation of the transporter element 233 is clear from the three positions shown in FIG. 10a to 10c. The transporter element 233 is, in fact, so controlled, that when the uppermost sheet 15 is drawn off the pile 1 in the direction of the arrow 240 initially only the retentive element 235 engages with this sheet. This position, which is shown in FIG. 10a, has the purpose of producing a step between the uppermost sheet 15 and the following sheets of the pile 1, theuppermost sheet 15 being pushed laterally by a distance by means of the adhesion between it and the retentive element 235. After this movement the cam 238 engages with the cam control member 239, as a result of which the transporter elememnt 233 is rotated anti-clockwise through a predetermined angle, in such a manner that the hook-like protuberance 234 engages with the rear edge portion of the sheet 15 and moves the sheet further. This hook-like protuberance 234 is, during the entire transport of the sheet 15, held by the straight, plate-like cam control member 239 in the same position, which position is such that the hook face of the protuberance 234 in engagement with the rear edge portion of the sheet 15 extends perpendicularly to the sheet edge. As can be seen from this mode of operation, the height of the hook h may easily be larger than the thickness of one sheet, because the hook-like protuberance 234 does not engage with the rear edge portion of the sheet 15 until this sheet has been pushed a distance in relation to the sheet pile 1, and so cannot engage another sheet edge. This ensures that the engagement of the hook-like protuberance 234 is very reliable.

On the return of the transporter element 233, which is shown in FIG. 10c, the transporter element is rotated about the axle 237 by the cam 238 and the cam control member 239 in the opposite direction, that is to say, clockwise, so that both the hook-like protuberance 234 and the retentive element 235 are disabled and the roller 236 can glide with its smooth gliding face 241, consisting, for example, of plastics material, over the sheet pile in the direction of the arrow 242.

It may also be mentioned here that a resilient contact pressure is always maintained between the pile 1 and the transporter element 233. Furthermore, the transporter element must not necessarily be in the shape of a roller, but in principle any correspondingly rotatable part can be used that has a convex face facing the sheet pile 1, on or in which there are provided one after the other in the direction of movement, the hook-like protuberance 234, the retentive element 235 and the gliding face 241.

FIGS. 12a and 12b show an embodiment illustrating a modification of the embodiment according to FIG. 1a, and this device is so designed that it may, in particular, be integrally produced from transparent plastics material. This means that the housing 2 with its lids 2a and the part 2b, which has the sheet edge bearing face 11 and limits one side each of the removal slot 10 and the insertion slot 16, are integrally produced, wherein the lid, which can be closed in the direction of the arrows 2c, is joined by a plastics joint 2d to the remaining part of the housing 2. The removal slot 10 is in this case formed by an aperture in the base of the housing 2, which aperture has in the central region of the housing a further extension 2e extending towards the inside of the housing, through which the lower sheet may be engaged by a finger and pushed in the direction of the removal slot 10 and thus removed from the housing, as shown in FIG. 12a.

Finally, FIGS. 11a and 11b show a modification of the device according to FIG. 4a, which differs from the latter in particular in that, for the complete removal of the sheet pile (not shown) the lid 49, which is attached to the slider member 43, can be hinged open, as indicated by the dot-dash lines in FIG. 11a. By means of a projection 243 provided on the lid 49, which may lock resiliently into a recess 244 in the slider member 43, the lid 49 is locked in the closed position. To operate the slider member 43, gripping faces 245 are provided at its front end above and below, whilst laterally corresponding gripping faces 246 are arranged on the opposite end of the housing.

Attention is here drawn to the fact that the individual features of any one of the described embodiments may be transferred to any of the other described embodiments, in so far as this is technically appropriate as regards cooperation with the respective, freely selectable sheet changing operation, or is technically appropriate in some other manner, or in so far as they do not interfere with the sheet changing operation at all, such as, for example, the special formation of the rotating wedge or the arrangement of the housing lid on the slider member or on the housing. In this sense the selected appendancies in the claims do not represent a limitation, but the claims can be appended, within the scope of what is technically expedient, to such other claims that are not expressly mentioned in the respective appendancy.

In particular, it is, for example, possible, to interchange the transport elements used to solve the transport problem (removal of one sheet), such as for example, the grab edges or the like, or to replace them by other elements acting on the sheet to be removed by gripping, holding or friction. For example, there may be used as the element engaging on the sheet instead of a grab edge or instead of a reduced pressure transporter element a series of free-running brushes, that is brushes disposed at an angle in the direction of withdrawal that when the sheet is removed "butt against" the underside of the sheet, whereas when the sheet is inserted slide "powerless" on the underside of the sheet. Instead of the brushes a series of saw-tooth like projections consisting of metal or some other sharp material may be used, the saw tooth edges of which are inclined in the direction of withdrawal of the slider member so that they, as it were, "stick into" the underside of the sheet, whereas when the slider member is reintroduced into the housing they slide over the underside of the sheet.

FIGS. 13 and 14 will be referred to in detail first of all; in these drawings the picture carrier, indicated as a whole by 301, is shown standing horizontally on a surface. This picture carrier consists essentially of a frame 302, a rear wall 303 joined thereto and preferably integrally formed therewith, and a prop 304, which, since it serves to support the picture carrier, may also be referred to as a stand.

The prop 304 is pivotally mounted in the rear wall 303 in such a manner that when the picture carrier 301 is not standing up the prop can be pivoted into the rear wall so that its rear side 305 is flush with the rear side 306 of the rear wall 303 and/or its front side 307 is flush with the front side 308 of the rear wall 303. A transport roll or roller 342 is mounted in the prop 304 and is described in detail further below.

The picture carrier 301 furthermore has two holes 309 and 310, of which one hole 309 is provided in the rear wall 303 halfway along the length of the picture carrier 301 and in the vicinity of one of its longer edges and the other hole 310 is provided halfway across the width of the picture carrier and in the vicinity of one of its shorter edges. These holes enable the picture carrier to be hung from an appropriate projection on the wall, for example, a nail head, a screw head or the like.

The picture carrier 301 can be stood or suspended both in the upright and in the horizontal position. The picture, which is not shown in FIGS. 13 and 14, is located in a gap or compartment 313 matching its thickness, which extends between the front side 308 of the rear wall 303 and the rear side (not shown) of the frame 302 in the region extending between the broken line 311 shown in FIG. 13 and the inner edge 312 of the frame 302. In the region of one edge, which is in fact a longitudinal edge 314, of the picture carrier 301, this gap 313 extends right through to the outside, so that the picture can be inserted into the picture carrier 301 at this edge and in the inserted position is supported by the front side 308 of the rear wall 303 and is displayed over the area surrounded by the inner edge 312 of the frame 302.

The thickness of the gap 313 is chosen in accordance with the thickness of the picture and where applicable, especially in the case of very large formats, in accordance with the thickness of a transparent cover plate and/or a rear backing plate or foil. For normal purposes, the thickness of the gap is between 0.1 and 1 mm. preferably, between 0.25 and 0.75 mm, especially preferably between 0.4 mm and 0.6 mm. In some instances the gap or compartment 313 may be thick enough or deep enough for two or more sheets in a pile, for storing extra sheets for periodic use.

At the area at which it joins the outer side of the picture carrier the gap 313 may be widened in cross section in the shape of a funnel over the entire gap length to facilitate the insertion of a picture. It is especially preferred, however, so to design the gap 313 at this area that the lateral edge 314 (indicated in FIG. 13 by a dot-dash line) of the rear wall 303 is set back along the opening area of the gap 313 with respect to the lateral edge 315 of the frame 302 of the picture carrier so that the wall 16 (not directly visible in FIGS. 13 and 14, but see FIGS. 18 and 21) of the continuous gap 313 is shortened on the outer side of the picture carrier with respect to the other wall 318. The part of the wall 318 which projects beyond the wall 316 thus forms a lateral stop for a picture to be inserted into the gap 313, whereby the insertion operation is facilitated. A funnel-shaped widening 319 may additionally be provided by a chamfer 321 of the wall 316 extending over the entire width of the gap 313, as shown in FIG. 21.

The rear wall 303 furthermore has a preferably rectangular recess 329 in which prop 304, which is explained in greater detail in an embodiment shown in FIGS. 15 to 17, can be recessed. For this purpose the prop 304 may be pivotally mounted on the rear wall 303 in such a manner that it can be pivoted backwards out of the rear wall 303 at one of its lateral edges, preferably at the lateral edge 330 perpendicular to the longitudinal direction, for which purpose, in the embodiment according to FIGS. 15 to 17, the ends of the lateral edge 330 take the form of preferably spherically-shaped pins 331, which project beyond the lateral edges 332 that extend in the longitudinal direction of the prop 304, and which engage in complementary depressions which are provided in the lateral edges of the recess 329, and into which they may be resiliently inserted.

So that the prop 304 remains or can be locked in a wide variety of inclined positions, although in certain circumstances jamming the prop in the rear wall in the region of the pins 331 may be adequate, there is provided around one of the pins 331 or, as shown in FIG. 15, around both pins 331, a so-called friction and/or locking area 334, which in the present case is a serrated area and is shown on an enlarged scale in FIG. 17. The teeth 335 of this area extend radially with respect to the pivot axis 336 of the prop 304 and likewise project slightly beyond the lateral edges 332 of the prop 304, as shown in FIG. 15. Although it is in principle possible to provide corresponding teeth 335 on the face of the rear wall to which the locking area 334 is adjacent, in the present embodiment this is not absolutely necessary because the edges of the rear wall that contact the locking area 334 may in any case act to a certain degree as "counter detents" in conjunction with the jamming action exerted by the rear wall.

Although the prop 304 may for the remainder be a flat, especially rectangular member matching the recess 329, which is provided with a recess 337 for the purpose of taking hold of it and pivoting it away from the rear wall 303, to save material it may instead have two longitudinal bars 338, which extend radially from the pivot axis 336 and are preferably tapered at their ends 339 remote from the pivot axis (see FIGS. 13, 14, 16 and 18) and which are joined to one or more transverse bars 340, which in the present case are planar. The thickness of the or each transverse bar 340 is smaller than that of the longitudinal bars 338, and in this case too a recess 337 is provided for taking hold of the prop and pivoting it out from the rear wall 303 and for accommodating a transport roll or roller 342.

For the latter purpose, in the region of the end of the prop 304 remote from the pivot axis 336, in the present case on the corresponding end of the longitudinal bars 338, a hole 341 is provided in each case. These holes act as a bearing for the axle 320 of a transport roller 342.

The recess 329 extends to the edge of the picture carrier a little beyond the inner edge 312 of the frame 302 (see FIG. 14). In this manner the rear side 319 forms a stop for the transport roll or roller. When the picture carrier 301 is empty this is a direct stop, whereas it is an indirect stop when a picture is inserted because then the edge of the picture is disposed between the stop and the lower end 339 of the prop. As a result of this stop, if no transparent cover plate is provided for the front side of the picture, the picture disposed in the picture carrier cannot be damaged by the prop 304 being pivoted into the rear wall because the latter is prevented from passing the picture out or even "piercing" it, and, above all, this stop then forms a support for the front side of the picture in the region in which it engages with the transport roll or roller 342.

In the embodiment of a picture carrier shown in FIGS. 18 and 19 there is a freely rotatably mounted transport roll or roller 342, which is arranged in the region of the gap 313, which extends through to the outside of the lateral edge 317 of the picture carrier, opposite a support face for the front side or a part of the front side of the picture. This support face is formed in the present embodiment by the rear side, facing the picture, of a transparent cover plate 343.

The roll or roller 342 is arranged in the region of that end of the prop 304 which is remoted from the pivot axis 336 of this prop, either in the general recess 337 (see FIGS. 13-15) or in a special recess 344, shown in FIG. 18. The roll or roller 324, consists of material, especially rubber, that is preferably grooved, fluted, knurled or roughened in some other manner, so that there results a good frictional engagement of the circumference of this roll or roller with the rear side of the picture, not shown in FIGS. 18, 19 and 21, the picture being disposed between the transparent cover plate 343 and the rear wall 303.

The roll or roller 342 makes it possible in a very simple manner for the particular picture to be conveyed into the picture carrier easily and without the risk of creased areas forming, by taking hold of that circumferential side of the roll or roller 342 which is accessible from the outside in order to rotate the roll or roller. In the same manner the picture can thereby be effortlessly removed from the picture carrier. Since the roll or roller is always pushed onto the rear side of the picture when operated, because it is attached to the free end of the pivotable prop 304, and can thus be moved onto the picture, good engagement between the circumference of the roll or roller and the rear side of the picture is always guaranteed.

The transparent cover plate 343, with which the front side of the picture is covered, is so attached that its lateral edges 345 are accommodated and held in the gap 313 between the rear wall 303 and the frame 302. In the picture carrier according to FIGS. 18 and 19 the gap 313 serves not only (as with the picture carrier shown in FIG. 21 and described hereinafter) to accommodate the picture but also to accommodate the transparent cover plate 343. So that this cover plate remains in the picture carrier when the picture is changed, the thickness of the gap 313 extending to the outside is smaller than the thickness of the cover plate. The transparent cover plate 343 can be changed in a simple manner by taking apart the frame 302 and the rear wall 303, when these are joined together, for example, by a plug joint which may consist of cylindrical projections and holes 325 complementary thereto.

The transparent cover plate 343 preferably consists of mineral glass, but may equally consist of a transparent plastics material, and it may furthermore be tinted, especially blue, pink, gold, or silver, or may be smoked. Furthermore, this cover plate may consist of material that is dazzle-free and non-reflective or of material that has been made dazzle-free and non-reflective.

An opaque cover plate 346 is arranged in the region of the recess 329 provided for countersinking the prop 304 in the rear wall 303. This cover plate is displaceable between at least one first and at least one second position, of which the first position is shown in FIG. 18. In this position the opaque cover plate 346 leaves open a portion of the rear side of the picture so that the latter can be taken hold of directly or, as shown in FIG. 18, so that the picture can be taken hold of by means of the roll or roller 342, that is to say, the cover plate 346 leaves free a portion of the recess 329 in the region of the recess 337 or 344, so that the picture disposed in the picture carrier is taken hold of by the roller or roll 342 or by hand through the recess 329 and can be removed laterally from the picture carrier or, when it is to be introduced, fully inserted into the picture carrier. In the second position, which is not shown, the cover plate 346 has been moved so far to the right in FIG. 18 that its righthand end comes to rest under the frame 302, so that as a result it completely covers that portion of the rear side of the picture which is left open by the recess 329 and is not disposed under the rear side of the frame.

By this means, a picture disposed in the picture carrier, especially when the prop 304 is pivoted out from the rear side 303, is prevented from receiving "light flecks" which would otherwise occur if the picture carrier received stronger light from behind than from in front, which may be the case, for example, when it is stood on a desk with its back to a window.

For the slidable guidance and accommodation of the opaque cover plate 346, a depression 347 is provided in the front side of the rear wall facing the picture. The depth of this depression is preferably the same as the thickness of the opaque cover plate 346. This depression 347 extends, as shown partially in FIG. 19, preferably at all sides beyond the edges of the recess 329, so that the cover plate 346, the breadth of which is equal to the breadth of the depression 347 in FIG. 19 and the length of which is equal or preferably slightly larger than the length L of the recess 329, in the second position reliably blocks any light from the rear side of the picture.

The opaque cover plate 346 may also be constructed as a transport slider member 322 (see FIG. 20), in which case, of course, the roll or roller 342 is omitted since the transport slider member 322 has the same task. It consists essentially of a plate 323, a lug or any other member mounted so as to be displaceable in the direction of insertion of the picture, on which member there are provided for mounting it, for example, guide means 324 that engage in complementary guide means (not shown) that are provided in the rear wall 303 or the prop 304 or, provided that the entire rear wall is constructed as a transport slider member, in the frame 302. The transport slider member 322 has on its side facing the rear side of the picture a retentive element 325, for example a small rubber patch, which carries the picture along. For clarity the thickness has been considerably enlarged in FIG. 320, for the retentive element 313 may, of course, be very thin, for example a thinly applied layer of rubber or plastics material.

So that the retentive element 325 does not carry with it a picture in the direction that is not desired, the transport slider member is so constructed or displaceably mounted that a certain minimum pressure is required to bring the retentive element 325 into firm engagement with the rear side of the picture, so that by alternately exerting in each case a relatively heavy and a fairly light pressure on the transport slider member 322, the user is able to transport the picture in the desired direction.

In the embodiment of FIG. 21, on the rear side 303 of the picture carrier 301 there is provided a compartment 326 which may be integral with the rear wall 303 and in the interior 327 of which other pictures may be kept. The recess 329 has in this case remained in the rear wall 303, whereas the prop 304 together with the transport roll or roller 342 are provided in a recess 329 in the lid 333 pivotally mounted at 328. This lid, which now forms the actual rear wall of the picture carrier 301 is normally held closed by a locking joint 348. To operate the roll 342 the additional pictures are removed from the compartment 326 and, after closing the lid 333, the prop 304 is then pivoted towards the rear wall 303 until the roller 342 engages on the picture. In this manner the user is able to replace a picture inserted in the gap 313 by another picture from the compartment 326.

The picture carrier according to the invention, depending on the embodiment, has all, or at least some, of the following advantages:

(a) The picture carrier is simply designed and has an aesthetic appearance, the slot in the preferred embodiment enabling a picture to be effortlessly and especially easily inserted into the picture carrier.

(b) The picture carrier is operationally safe and reliable; in particular the picture is arranged self-mounted in the picture carrier, and may easily be inserted and removed by the transport roll or roller or the transport slider member.

(c) The picture carrier is light and simple to handle, for the picture simply has to be introduced through a slot at the side and can easily be changed by anyone.

(d) The picture carrier is versatile, for it makes it possible for a picture to be displayed either in the upright or horizontal position and in the suspended or stand-up position. For the latter purpose, it has a self-locking prop which can be fully countersunk in the rear wall, so that hanging on the wall is facilitated. For the purpose of hanging the carrier on the wall, holes are provided into which either when hanging horizontally or hanging upright the head of a nail can engage. Furthermore the picture carrier is versatile in its use in so far as it can advantageously be produced for all sizes of picture.

(e) The picture carrier can be produced at a favourable price; in particular it requires no glass cover, may be made in one piece or, when the prop is produced as a separate part, may be cheaply produced in two parts and requires very little material. Also expenditure on time is low and, on assembly, the prop with its pins snaps easily into the corresponding recesses in the rear wall. The frame may be completely or partially printed so as to achieve an ornamental effect.

(f) Finally, the picture carrier is simple to transport and especially in its embodiment for normal photographs can be sent in the form of a letter or in a letter, as there is no risk to the glass cover breaking because a glass cover is not used, and the fact that the prop can be completely countersunk in the rear wall favours dispatch in a letter.

I claim:

1. A picture viewer for the alternate exposure of individual rectangular sheets from a pile of sheets, comprising an enclosure having a viewing window and a compartment with sufficient depth to accommodate such a pile, one end of the compartment being disposed at the window to display a sheet through the window, another side of the compartment having an access opening, means permitting separation of one sheet from one end of said pile and adding it to said pile at the other end thereof, said means including: pile support means opposite said viewing window and pile suppression means adjacent said window, a separator bar extending parallel to congruent edges of said sheets in said pile and having a first edge opposite said window and a second edge adjacent thereto, said separator edges being spaced from each other such that removal and insertion slots are defined between respective separator edges and compartment walls confining said access opening, said pile support means and said pile suppression means being spaced from each other by a distance exceeding the distance by which said separator edges are spaced from each other, the separator bar further having a first oblique face confronting said congruent sheet edges and a second oblique face opposite said first face, both said separator faces extending between said first and said second separator edge, whereby a sheet to be separated from said pile and thrust edgewise against said separator is deflected away from said pile permitting it to be fed through one of said slots and whereby a sheet when added to said pile after being fed through one of said slots will be retained by said separator bar at its edge adjacent the latter.

2. A picture viewer according to claim 1, wherein at least one separating stop is provided at a first end of the compartment adjacent the separator bar and having a stop face over which the rectangular sheets extend, the separating stop being spaced from the bar by a separating space which communicates with the removal slot at the adjacent edge of the separator bar, the removal slot being offset from the stop face by an extended portion of the separating bar adjacent the edge thereof requiring the rectangular sheets to be deflected and bent as they pass through the separating space and removal slot.

3. A picture viewer according to claim 2, wherein the distance across the separating space from the separating stop to the stop bar is small in relation to the length of the compartment extending perpendicular to the sheet edge bearing face whereby the frictional force transmitted between the sheet to be removed and the sheet adjacent thereto is small in relation to the bending force necessary to bend the sheet edge portions at the sheet edge bearing face so as to introduce the sheet edge portion into the separating space and removal slot.

4. A picture viewer according to claim 1, wherein the removal slot has a width which is somewhat larger than the thickness of one sheet and has a length which is somewhat larger than the length of the edges of the sheets extending parallel thereto.

5. A picture viewer according to claim 1, wherein one end of the compartment has a support face extending parallel to the sheet faces, against which the pile of sheets can be pressed.

6. A picture viewer according to claim 1, wherein in the region of or instead of the separating slot an open access means is provided at one end of the compartment and adjacent the removal slot for exerting finger pressure on the end sheet.

7. A picture viewer according to claim 1, wherein a sheet insertion means for inserting a sheet into the pile, especially for reinserting a sheet that has been removed from the pile, is provided.

8. A picture viewer according to claim 7, wherein the insertion slot at a second end of the compartment is adjacent a second extended portion of the separator bar and the corresponding adjacent edge thereof, there being an insertion space adjacent the sheet edge bearing face of the separator bar and adjacent the face of the end sheet which edgeways confronts the second extended portion of the separator bar whereby the edge portion of a sheet entering into the pile through the insertion slot and insertion space can be pushed into the pile without interference by the edges of the sheets disposed in the pile.

9. A picture viewer according to claim 8, wherein there is provided at least one insertion stop at the second end of the compartment and adjacent the insertion space, the insertion stop having a stop face against which the endmost sheet lies, the stop face being offset from the insertion slot by the second extended portion of the separator bar.

10. A picture viewer according to claim 9, wherein the distance between the second extended portion and the stop face of the insertion stop is small in relation to the sheet length or breadth extending perpendicular to the first oblique face.

11. A picture viewer according to claim 8, wherein the insertion slot has a width which is somewhat larger than the thickness of one sheet and a length which is somewhat larger than the length of the edges of the sheets extending parallel thereto.

12. A picture viewer according to claim 11, wherein the sheet edge bearing face is oriented at an acute angle with the adjacent end of the compartment.

13. A picture viewer according to claim 8, wherein there is provided means in the enclosure defining a counter sheet edge bearing face at the side of the compartment opposite the separator bar, said counter sheet edge bearing face being oriented at an acute angle with the adjacent end of the compartment.

14. A picture viewer according to claim 1 or 12 or 13, wherein the acute angle is between 30° and 60°, preferably between 45° and 60°.

15. A picture viewer according to claim 14, wherein the acute angle is between 40° and 45°, and is preferably 42°.

16. A picture viewer according to claim 1 or 8, wherein at least one of the extended portions is adjustable in its length.

17. A picture viewer according to claim 1 or 12 or 13, wherein the acute angle of the first oblique face is adjustable.

18. A picture viewer according to claim 2, wherein the first oblique face is planar.

19. A picture viewer according to claim 13, wherein the first oblique face and the counter sheet edge bearing face are substantially parallel to one another.

20. A picture viewer according to claim 13, wherein the counter sheet edge bearing face is provided on a rotatable component, preferably an essentially wedge-shaped component, which is pivotable about an axis parallel to the sheet edges and of which the face opposite the counter sheet edge bearing face preferably forms a sidewall of a housing accommodating the sheets.

21. A picture viewer according to claim 20, wherein the wedge-shaped component has at its tapered end a lug engaging beneath the pile, which when pivoted lifts the pile out of the normal position.

22. A picture viewer according to claim 20, further comprising a locking means for locking the wedge-shaped component in its normal position.

23. A picture viewer according to claim 22, wherein the locking means comprises a plane face, which is preferably a face of the base of a housing accommodating the pile of sheets, wherein furthermore a counter plane face is provided at the opposite side of the rotatable component, which face, in the direction of rotation opposite to that for pivoting the component out of its normal position, becomes a curved face, the radius of curvature of which diminishes to a radius that is equal to the distance between the axis of rotation of the component and the plane face.

24. A picture viewer according to claim 23, wherein the counter plane face, in the direction of rotation in which the component is pivoted out of its normal position, becomes the lug.

25. A picture viewer according to claim 20, wherein the rotatable component has one or more protuberances, which in the normal position of this component engages or engage over the adjacent edge of the pile of sheets.

26. A picture viewer according to claim 2, wherein the separating stop includes a rubber roller for shifting the sheet toward the removal slot.

27. A picture viewer according to claim 26, wherein the roller has portions exposed to the exterior of the enclosure to be accessible by hand in order to rotate it.

28. A picture viewer according to claim 26, wherein the roller has an axis extending parallel to the removal slot, and is movable toward and away from the end of the compartment and the pile of sheets therein.

29. A picture viewer according to claim 26, wherein the coefficient of friction between the surface of the roll or roller and the sheet side facing it is large in comparison with the coefficient of friction between adjacent sheets.

30. A picture viewer according to claim 28, wherein the roll or roller is mounted on a loop, which is pivotable about an axis of rotation that extends parallel to the removal slot.

31. A picture viewer according to claim 30, wherein the loop is arranged so that it can be sunk in the base of the enclosure accommodating the pile of sheets.

32. A picture viewer according to claim 26, and means mounting the roller for movement backwards and forwards in the direction of displacement of the sheets to be removed and in the opposite direction thereto, and also mounting the roller for rotating in only one direction, wherein the roller, which if desired does not form a separating stop, is returned to its rest position by a return spring after a sheet has been removed.

33. A picture viewer according to claim 26, wherein there are a plurality of separating stops one being a roller arranged at the rear area, in relation to the direction of displacement of the sheets to be removed.

34. A picture viewer according to claim 30, wherein the loop can be pivoted into and preferably locked in first and second angular positions.

35. A picture viewer according to claim 1, wherein there is provided at least one separating and at least one insertion stop, one of the stops being on the support face of the pile support means, and the other of the stops being on the counter support face of the pile suppression means which is opposite the support face.

36. A picture viewer according to claim 5, wherein there is provided an essentially transparent lid of the enclosure accommodating the pile of sheets, and means defining said support face.

37. A picture viewer according to claim 36, wherein there is provided a counter support face one support face is on the lid and the other on the base of the enclosure.

38. A picture viewer according to claim 36, wherein the counter support face is provided on a pressure plate resiliently pressing the pile of sheets against the support face, a conical spiral spring preferably being provided on that side of the pressure plate which is remote from the sheet pile.

39. A picture viewer according to claim 36, wherein the counter support face and/or the insertion stop and/or an insertion tongue adjacent thereto are formed by a resilient frame, especially by a frame formed in one piece from wire or resilient plastics material.

40. A picture viewer according to claim 2 or 9, and the stop being resiliently formed.

41. A picture viewer according to claim 4, wherein a slider member is provided, which is movable perpendicular to the removal slot to such an extent that it completely accommodates, on transport faces provided therefor, the sheet emerging from the slot.

42. A picture viewer according to claim 41, wherein for its back and forth movement the slider member is mounted and guided on the sheet pile holding device or on a housing for the sheet pile.

43. A picture viewer according to claim 42, wherein the slider member has a frame, wich extends along those lateral edges of the end sheet, at the removal slot side and/or insertion slot side, of the sheet pile which extend in the direction of movement of the slider member.

44. A picture viewer according to claim 43, wherein there are provided on the slider member, in the region of the lateral edges of the removed sheet, springs, especially leaf springs, which extend in the direction of movement of the slider member and push the sheet emerging from the removal slot into the plane of the transport faces.

45. A picture viewer according to claim 44, wherein the springs provided on the slider member are, in the vicinity of the removal slot, designed as a separating stop, preferably in such a manner that they have a curved projection, which in each case forms a resilient separating stop.

46. A picture viewer according to claim 44, wherein the springs are each guided in a recess which is provided in a defining face of the removal slot.

47. A picture viewer according to claim 41, wherein the removal slot and/or the insertion slot is formed between a removal slot or insertion slot limiting member provided on the sheet pile holding device or on a housing accommodating the sheet pile, and a second removal slot or insertion slot limiting member provided on the slider member.

48. A picture viewer according to claim 47, wherein the first removal slot or insertion slot limiting member carries the sheet edge bearing face and is especially in the form of a wedge.

49. A picture viewer according to claim 47 or 48, wherein the second removal slot limiting member is a plate provided on the slider member, especially a transparent cover plate, which when the slider member is not in the drawn out state forms the housing lid of a housing accommodating the pile of sheets, whereas the second insertion slot limiting member is formed by one or more slider member parts extending in the direction of movement of the slider member, or vice versa.

50. A picture viewer according to claim 41, wherein a grab member which transports the end sheet, at the removal slot side, of the pile, is provided on the slider member.

51. A picture viewer according to claim 50, wherein the grab member has a suction means connected to a vacuum pump which can be operated and controlled by movement of the slider member.

52. A picture viewer according to claim 50, wherein the grab member is in the form of a projection, which engages with the near edge, disposed in the vicinity of the counter sheet edge bearing face, of the end sheet, at the removal slot side, of the pile, wherein there is preferably provided adjacent to the grab member in the direction of withdrawal of the slider member a cavity in the sheet edge bearing face, of which the extension in the direction of movement is so short that the sheet second-most adjacent to the grab member cannot bend into the cavity, wherein preferably a retentive element is arranged in the cavity beyond which element the grab edge extends only by a distance that is smaller than the sheet thickness.

53. A picture viewer according to claim 52, wherein the counter sheet edge bearing face has in the region of the rear edge of the end sheet at the removal slot side, two step-like shoulders having a step height that is approximately equal to the thickness of one sheet.

54. A picture viewer according to claim 53, wherein the step-like shoulders are provided on the rotatable, especially wedge-shaped, component.

55. A picture viewer according to claim 38 wherein the conical spiral spring is so arranged or so designed that the pressure on that end of the pressure plate which faces the counter sheet edge bearing face is greater than that on the other opposite-lying end.

56. A picture viewer according to claim 1, wherein a housing accommodating the sheet pile is provided.

57. A picture viewer according to claim 56, wherein the lid of the housing for introducing the pile of sheets is hinged or push-on.

58. A picture viewer according to claim 56, wherein for viewing and/or reading the sheets, the lid of the housing is completely or at least predominantly transparent.

59. A picture viewer according to claim 56, wherein the housing is provided with one or more stacking means for stacking several similar housings.

60. A picture viewer according to claim 59, wherein the housing is provided with stacking grooves and protuberances.

61. A picture viewer according to claim 4, wherein the compartment wall adjacent the removal slot is curved or inclined at an acute angle relative to the first oblique face of the separator bar.

62. A picture viewer according to claim 61, wherein the acute angle is between 1° and 10°, preferably between 2° and 4°.

63. A picture viewer according to claim 41, wherein the slider member is provided on its upper and/or lower side at the front in the direction of withdrawal, with a gripping face, which is, if desired, in the form of a flange, which in the inserted position of the slider member is accommodated by a recess of complementary shape formed in the housing, and that the slider member, if necessary, has lateral gripping faces.

64. A picture viewer according to claim 56, wherein the housing is provided with one or more suspending means and/or with one or more holes for suspending it at its rear side.

65. A picture viewer according to claim 56 or 41, wherein there are provided on the slider member and/or on the housing bearing faces for the sheets and/or the removed sheet, which prevent the sheets and/or the removed sheet from falling, being pushed or sliding, or the like, out of the slider member and/or the housing in any position.

66. A picture viewer according to claim 26, wherein the roller has a slot extending parallel to the direction of the axis all along its length, which slot extends approximately tangentially in the direction of rotation from an axial hole to the peripheral face and through which an axle can be inserted into the axial hole.

67. A picture viewer according to claim 1, wherein the sheet edge bearing face is provided on a component which is especially of wedge-shaped or triangular cross section and is resiliently rotatable against a returning force and which by means of an operating element provided on the slider member, especially by means of a cam-like projection, can be rotated, before a sheet to be inserted enters, in such a manner that guide face provided thereon which after rotation faces the sheet, guides the front edge portion of the sheet out of the region of the removal slot into the region of the insertion slot.

68. A picture viewer for the alternate exposure of individual sheets from a pile, especially a photo-viewing change device, according to claim 1, having a housing accommodating the pile of sheets, the base of which extends parallel to the sheet faces and the sidewalls of which laterally surround the sheet pile, wherein the lid of the housing is attached to a slider member and together with this can be drawn so far out of the housing, parallel to the sheet faces at one side thereof, that it still remains on the housing when in its outermost position and engages over the sheet pile by a predetermined length, or when the slider member is drawn out the sheet pile is overlapped by a predetermined length from the side of the housing at which the slider member is drawn out, wherein, furthermore, one or more protuberances engaging over the pile of sheets are provided and/or this sidewall itself engages over the pile of sheets, wherein the sidewall, opposite the slider member, of the housing is attached to an additional slider member, which is held in the housing by a locking means, and on operation of this means can be pulled out of the housing somewhat further than the predetermined length by which the pile of sheets is overlapped at the slider member side in the fully drawn out position of the slider member.

69. A picture viewer according to claim 68, wherein the locking means has a retaining catch mounted on the additional slider member and engaging in a notch stop.

70. A picture viewer according to claim 69, wherein the retaining catch is arranged on a tongue and by pivoting the tongue can be brought out of engagement with the notch stop in the housing.

71. A picture viewer according to claim 70, wherein when the additional slider member is fully inserted in the housing, the retaining catch is held in engagement with the notch stop in the housing resiliently, especially by the inherent resilience of the tongue, and that the retaining catch can be disengaged from the notch stop by pressing on the tongue in the direction of the inside of the housing.

72. A picture viewer according to claim 70, wherein on pivoting the tongue, that side of the tongue which faces the pile of sheets comes into engagement with the pile.

73. A picture viewer according to claim 72, wherein the tongue is provided at the area at which it engages with the sheet pile with an engaging face of high friction.

74. A picture viewer according to claim 73, wherein the engaging face of high friction is formed by a friction element, especially a rubber platelet, arranged on the tongue.

75. A picture viewer according to claim 70, wherein a finger engagement recess is provided in the tongue for pivoting the tongue.

76. A picture viewer according to claim 70, wherein the tongue is disposed towards the inside of the housing from a gripping face, which is provided for holding the housing while operating the slider member.

77. A picture viewer according to claim 75, wherein the finger recess is arranged next to the gripping face, preferably directly next to the gripping face.

78. A picture viewer according to claim 73, wherein the tongue, at its free end at which the engaging face is provided, extends in the direction of the slider member beyond the center of the housing.

79. A picture viewer according to claim 70, wherein the tongue is provided in a preferably likewise tongue-shaped guide member of the additional slider member, which slider member is displaceable along guide faces in the housing, especially in the housing base, in the direction of movement of the additional slider member.

80. A picture viewer according to claim 79, wherein there is provided on the guide member a stop which limits the movement of the additional slider member out of the housing and cooperates with a counter stop on the housing, especially in the base of the housing.

81. A picture viewer according to claim 51, wherein the suction means is provided in a first part of the slider member, whereas the operating element for the suction means is coupled to a second slider member part, which is so mounted in the first part of the slider member as to be displaceable in the direction of withdrawal of the slider member by a predetermined distance.

82. A picture viewer according to claim 81, wherein the operating element is a piston rod secured at one end to the second part of the slider member, at the other end of which a piston is mounted, which can be moved back and forth in a cylindrical bore provided in the first part of the slider member, wherein this bore has a suction aperture which is directly adjacent to the uppermost sheet of the sheet pile.

83. A picture viewer according to claim 82, wherein a shallow recess is provided around the suction aperture in which a seal extending around the suction aperture is countersunk.

84. A picture viewer according to claim 82, wherein the movement of the second part of the slider member away from the first part is limited by a stop for the piston of the suction means, whereas the movement of the second part towards the first part of the slider member is limited by a stop provided on the second part and by a counter stop cooperating therewith disposed on the first part.

85. A picture viewer according to claim 41, wherein a housing accommodating the sheet pile is provided, and in that a grab member is arranged in a recess provided in the lid of the housing and can move perpendicularly to the plane of the sheets of the pile, wherein it is pressed by a spring in the direction of the pile of sheets so that a retentive element provided in a recess in the grab member engages with the uppermost sheet of the sheet pile when the slider member is disposed in the inserted state or when it is drawn out of the housing.

86. A picture viewer according to claim 85, wherein there is provided on the grab member, after the retentive element in the direction of withdrawal of the slider member, a hook-like protuberance projecting beyond the latter in the direction of the pile of sheets.

87. A picture viewer according to claim 85, wherein a drawer is mounted in the slider member which for the total removal of the pile can be drawn out of the slider member, which remains in the housing, in a direction opposite to the direction of withdrawal of the slider member.

88. A picture viewer according to claim 50, wherein the grab member is a transporter element, which has a convex face facing the sheet pile in which or on which face, respectively, there are provided in the direction of withdrawal of the slider member, one after the other, a hook-like projection, a retentive element and a gliding face, wherein the transporter element is mounted in the slider member so as to be rotatable about an axle and carries a cam which cooperates with a cam control member provided on the housing, so that when the slider member is pulled out the uppermost sheet of the pile is first of all taken along a first distance by the retentive element, after which the transporter element pivots about the axle, as a result of which the hook-like projection engages with the rear sheet edge, in the direction of movement of the slider member, of the uppermost sheet, whereas when the slider member is pushed into the housing the transporter element is rotated about the axle in the opposite direction, so that it comes into engagement with the sheet pile by way of its gliding face.

89. A picture viewer according to claim 88, wherein the transporter element bears resiliently against the sheet pile.

90. A picture viewer according to claim 26, wherein the roll or roller, which is optionally provided only for displacing the sheets, that is in addition to one or more separating stops, is attached to a prop which is pivotable out of the base of the housing and which in turn can be locked in a position recessed in the base of the housing, for which purpose projections are preferably provided on the prop which cooperate resiliently with the edges of the housing base.

91. A picture viewer according to claim 56, wherein a drawer is provided, which can be moved out of the housing for the total removal of the pile of sheets.

92. A picture viewer according to claim 91, wherein recesses are provided in the sides and in the base of the drawer, which render possible taking hold of the pile of sheets at the sides.

93. A picture viewer according to claim 92, wherein the recesses are provided in the front part of the drawer in the direction of withdrawal of the same.

94. A picture viewer according to claim 91, wherein a stop in the form of a projection is provided on the drawer, which cooperates with counter stops on the housing in such a manner that on the one hand the drawer is resiliently locked with respect to the housing in its position in which it is completely inserted in the housing, and on the other hand the drawer cannot be completely removed from the housing.

95. A picture viewer according to claim 41 or 56, wherein the lid of the slider member or of the housing is in the form of a hinged lid.

96. A picture viewer according to claim 95, wherein for the hinged lid to be locked in its normal position a projection is provided, which locks resiliently into a recess in the slider member or in the housing, or vice versa.

97. A picture viewer according to claim 95, wherein the hinged lid is joined to the housing or to the slider member by means of a plastics joint which is integral with the lid and the housing or with the slider member.

98. A picture viewer according to claim 97, wherein it is integrally produced from plastic material, so that especially the hinged lid, the housing and the part that carries the sheet edge bearing face, consist of one piece.

99. A picture viewer according to claim 4, wherein the removal slot is in the form of an aperture in the base of the housing.

100. A picture viewer according to claim 99, wherein the removal slot extends into an aperture in the base of the enclosure which extends from the slot towards the inside of the enclosure, by means of which aperture the underside of the sheet pile is accessible by hand to facilitate removal of the lowermost sheet.

* * * * *